(12) United States Patent
Dillon et al.

(10) Patent No.: US 12,186,779 B2
(45) Date of Patent: Jan. 7, 2025

(54) RADIATION DETECTION SYSTEM

(71) Applicant: ISO-Pacific Remediation Technologies, Inc., Richland, WA (US)

(72) Inventors: Michael John Dillon, Richland, WA (US); Lori Dillon, Richland, WA (US)

(73) Assignee: ISO-PACIFIC REMEDIATION TECHNOLOGIES, INC., Richland, WA (US)

( * ) Notice: Subject to any disclaimer, the term of this patent is extended or adjusted under 35 U.S.C. 154(b) by 112 days.

(21) Appl. No.: 17/095,404

(22) Filed: Nov. 11, 2020

(65) Prior Publication Data

US 2021/0138509 A1   May 13, 2021

Related U.S. Application Data

(60) Provisional application No. 62/933,854, filed on Nov. 11, 2019.

(51) Int. Cl.
| | |
|---|---|
| *G01T 1/20* | (2006.01) |
| *B07C 5/346* | (2006.01) |
| *G01T 1/167* | (2006.01) |

(52) U.S. Cl.
CPC .............. *B07C 5/346* (2013.01); *G01T 1/167* (2013.01); *G01T 1/20184* (2020.05)

(58) Field of Classification Search
CPC ........... B07C 5/346; G01T 1/167; G01T 1/20; G01G 1/20184; G21F 9/28
See application file for complete search history.

(56) References Cited

U.S. PATENT DOCUMENTS

| | | | |
|---|---|---|---|
| 5,635,714 A * | 6/1997 | Nablo ..................... | H01J 33/00 250/492.1 |
| 9,457,382 B1 * | 10/2016 | Dillon ..................... | B07C 5/346 |
| 9,588,236 B2 * | 3/2017 | Azuma ..................... | G01T 1/24 |

\* cited by examiner

*Primary Examiner* — Patrick H Mackey
(74) *Attorney, Agent, or Firm* — Davis Wright Tremaine LLP; Heather M. Colburn

(57) ABSTRACT

A radiation detection system that includes a radiation detector, a photo multiplier tube, and a pulse height analyzer. The radiation detector is configured to emit light when exposed to radiation. The photo multiplier tube is configured to convert the light to an electrical signal. The pulse height analyzer is configured to output at least one value associated with an amount of radiation detected based on at least in part on the electrical signal.

29 Claims, 17 Drawing Sheets

RADIATION DETECTION SYSTEM

CROSS REFERENCE TO RELATED APPLICATION(S)

This application claims the benefit of U.S. Provisional Application No. 62/933,854, filed on Nov. 11, 2019, which is incorporated herein by reference in its entirety.

BACKGROUND OF THE INVENTION

Field of the Invention

The present invention is directed generally to radiation detection systems.

Description of the Related Art

Nuclear waste generators ship radioactive soil to expensive and highly regulated landfills for long-term storage and/or final disposal. Unfortunately, the cost of this type of disposal has increased over the years. Further, many landfills have closed, creating an ever-increasing demand for this type of storage.

Soils contaminated by radionuclides are often heterogeneous having both clean and contaminated portions. Further, excavating a contaminated site typically mixes significant volumes of clean soil with contaminated soil. Therefore, a need exists for systems and methods that segregate or separate clean soil from contaminated soil thereby reducing the volume of waste in need of disposal and/or long-term storage. Because other types of materials, such as concrete rubble, masonry rubble, ores, ashes, metallic pieces, metallic scraps, vegetable matter, and other types of debris could also be partially contaminated, systems and methods configured to evaluate such materials would be particularly desirable.

BRIEF DESCRIPTION OF THE SEVERAL VIEWS OF THE DRAWING(S)

Various embodiments in accordance with the present disclosure will be described with reference to the following drawings.

Figure 3:
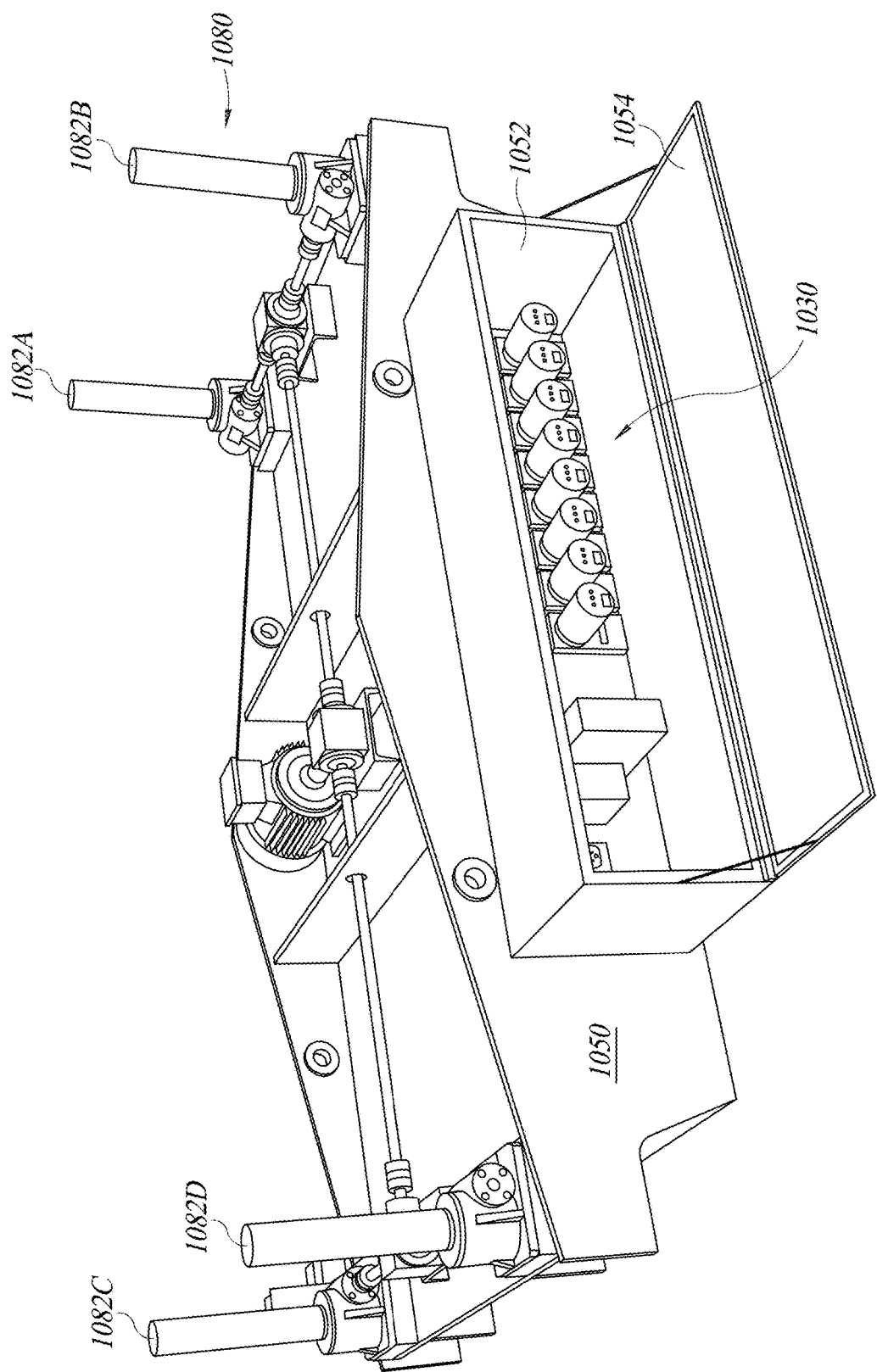
FIG. 3 is rear side perspective view of a detector box configured to house a detector array of the radiation detection system of FIG. 2.
Figure 13:
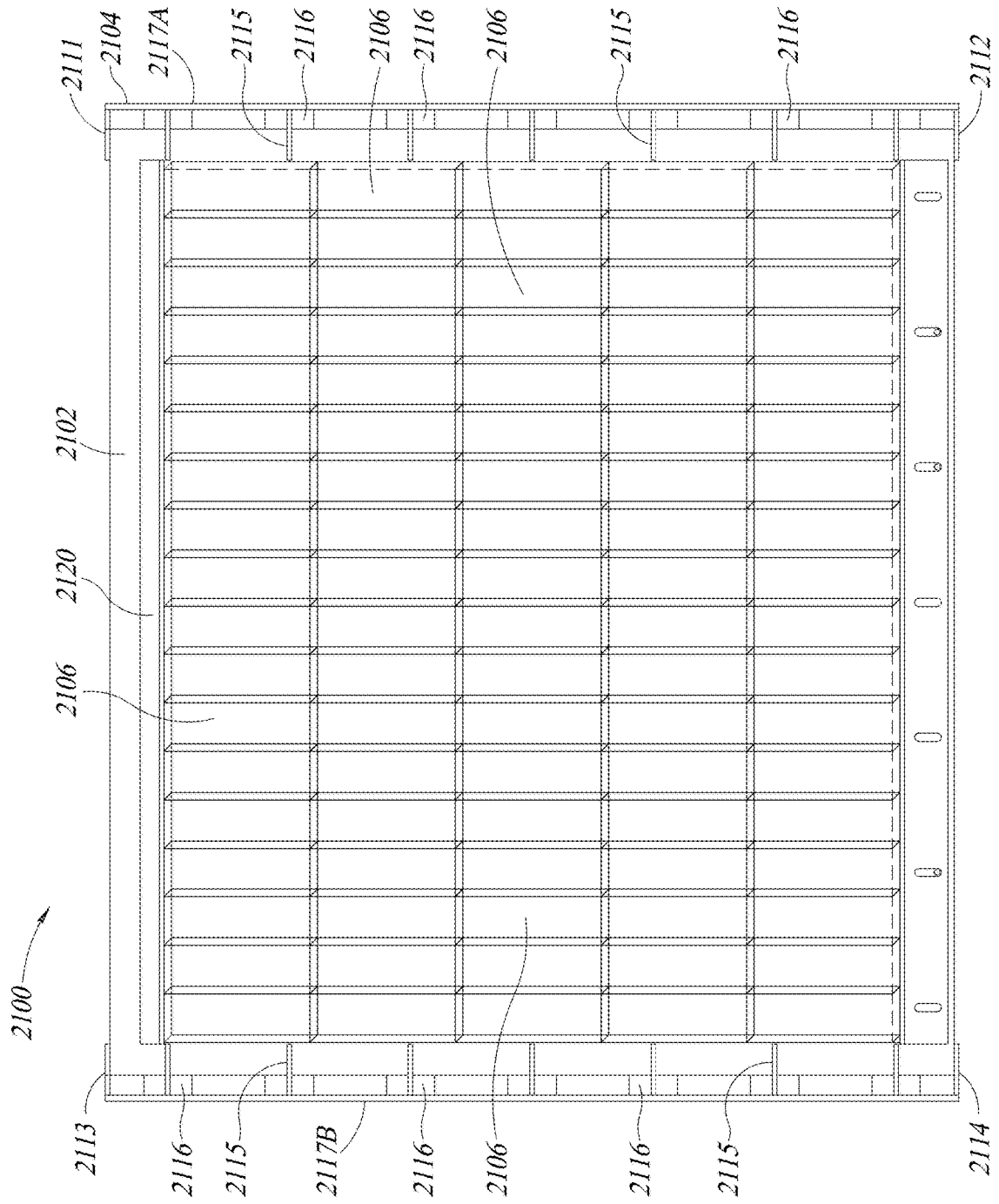
FIG. 13 is a top view of a shadow shield assembly configured to be positioned below the detector box of FIG. 3.
Figure 14:
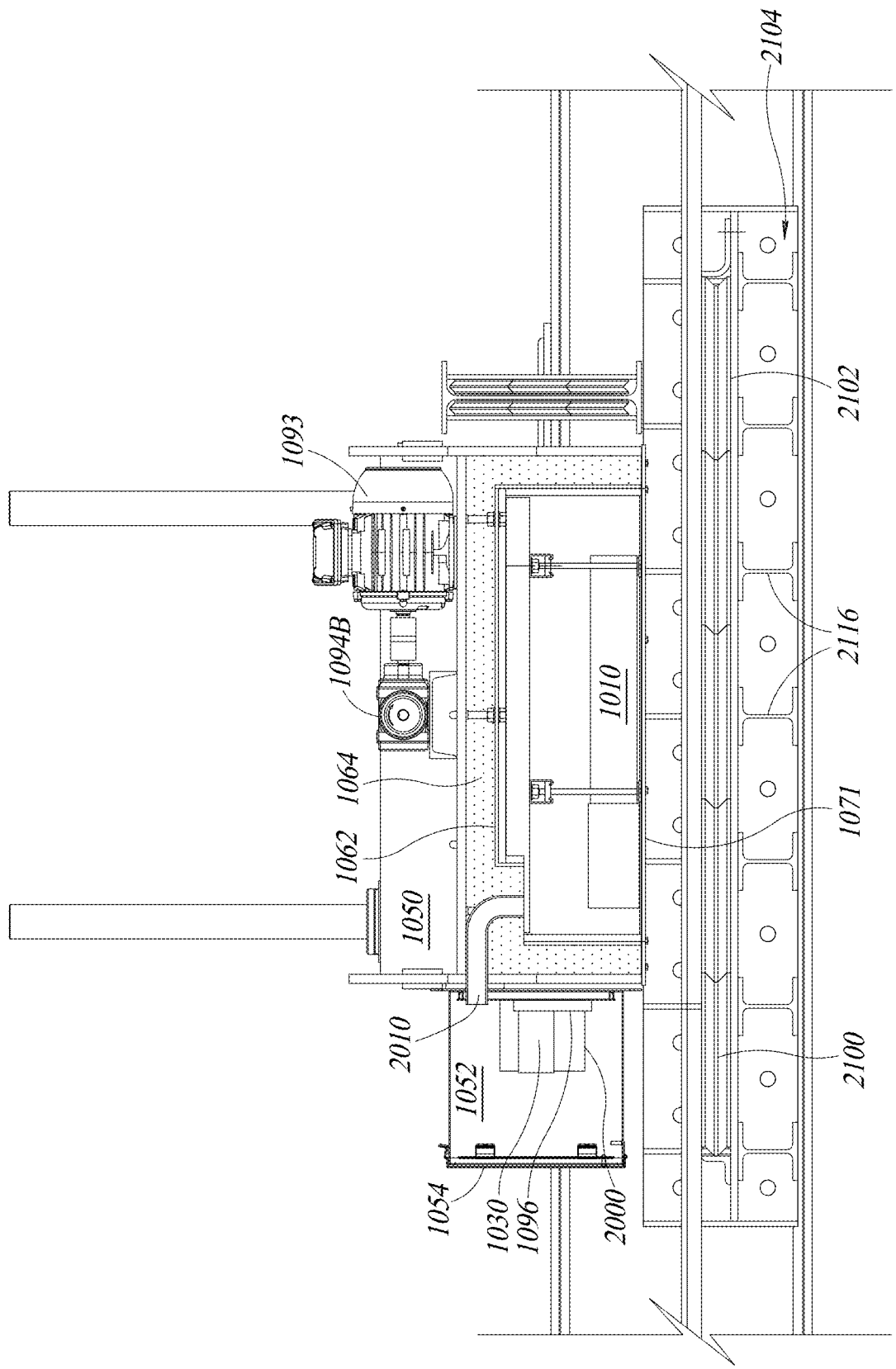

FIG. 14 a cross-sectional side view of the detector box of FIG. 3 positioned above the shadow shield assembly of FIG. 13.

Figure 15:
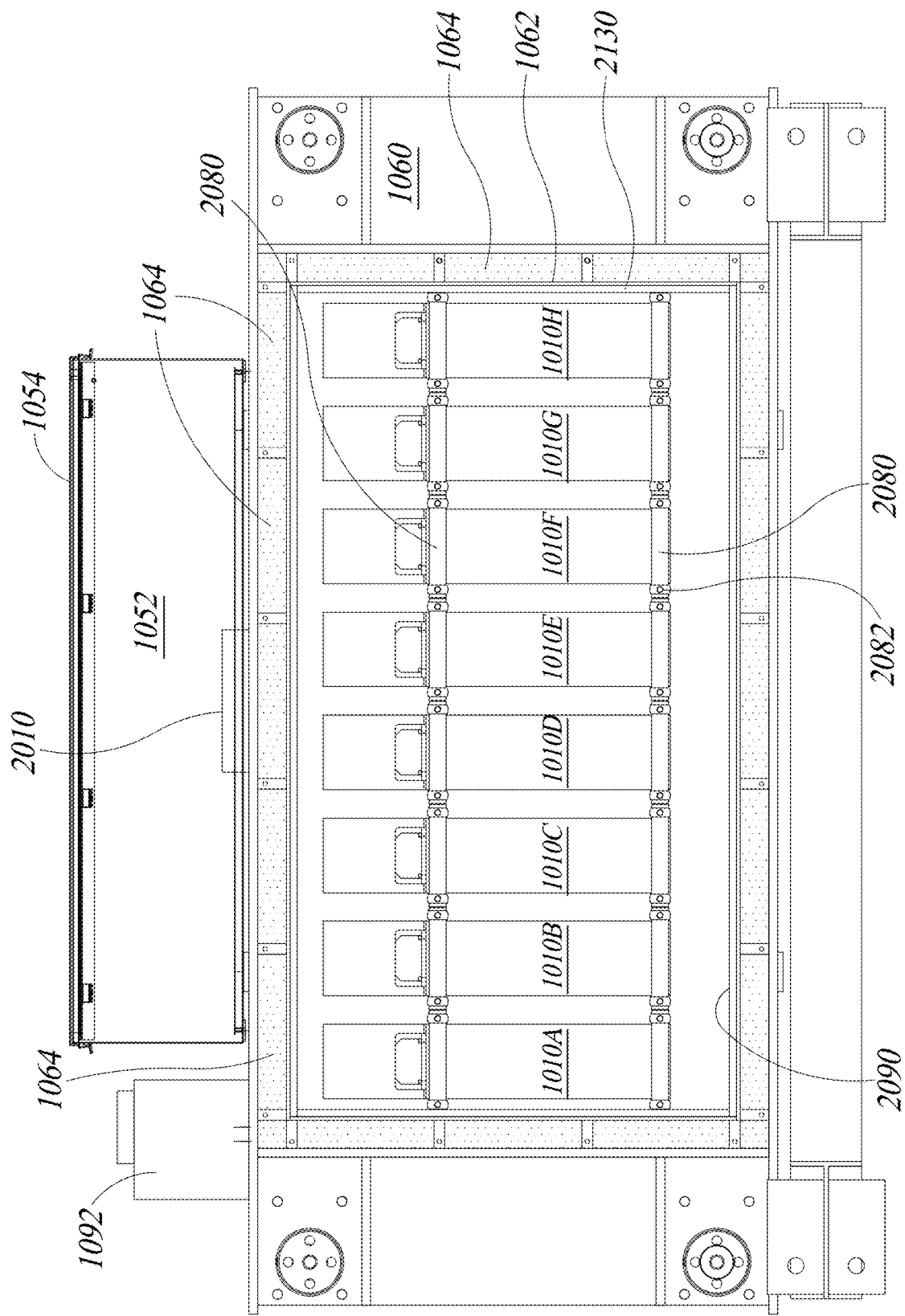

FIG. 15 is a bottom view of the underside of the detector box of FIG. 3 omitting the titanium window.

Figure 16:
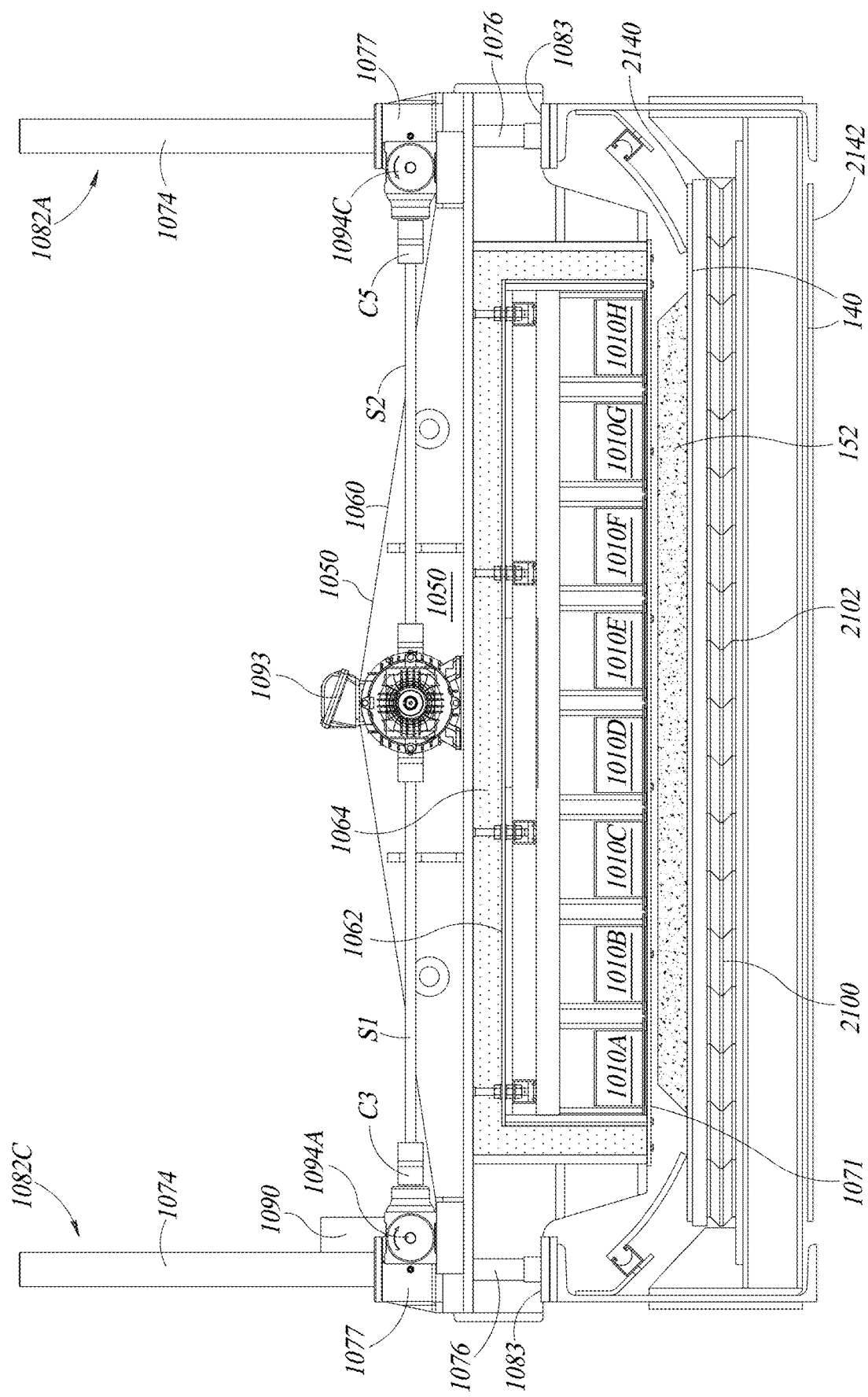

FIG. 16 a cross-sectional front view of the detector box of FIG. 3 positioned above the shadow shield assembly of FIG. 13.

Figure 2:
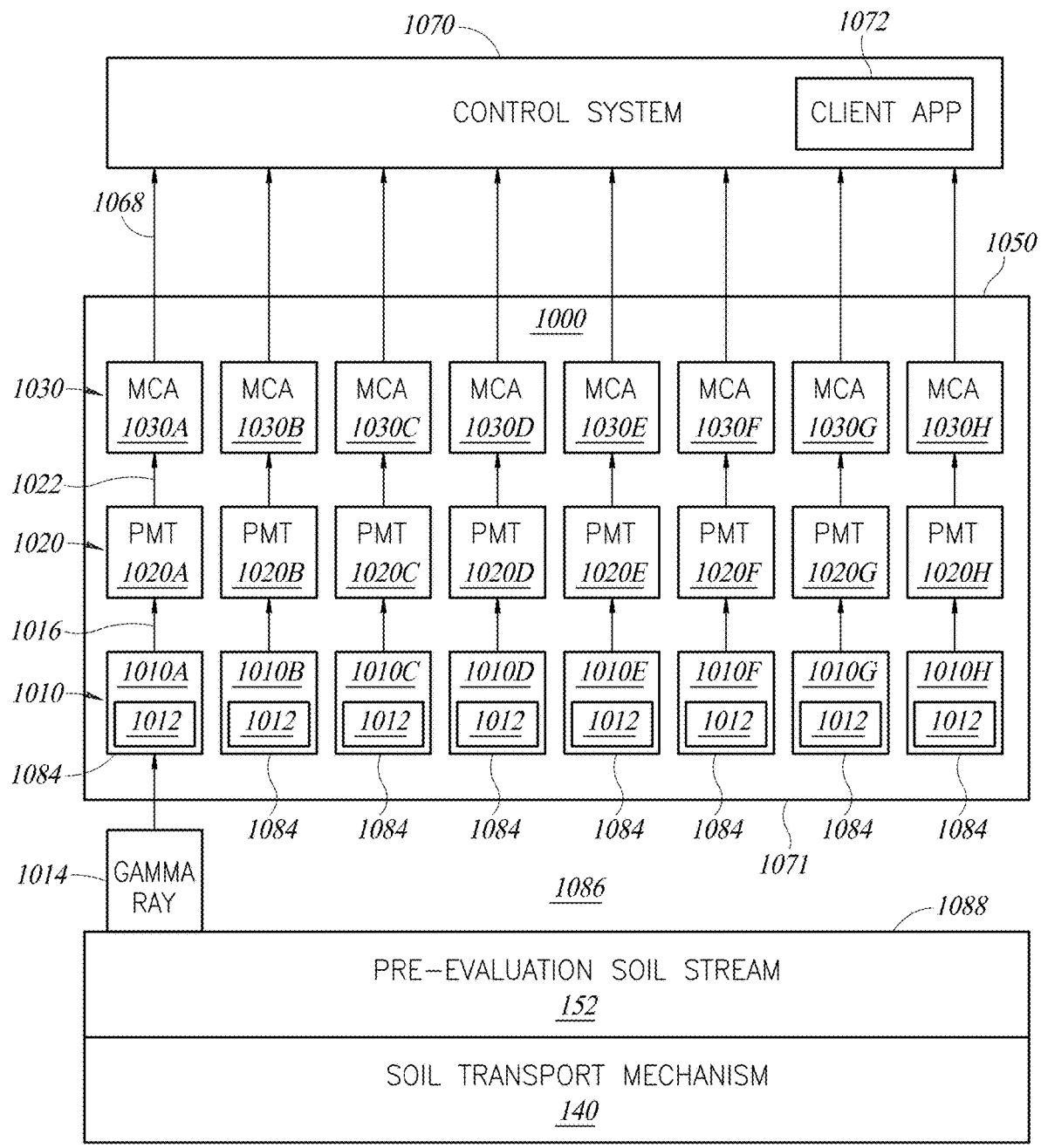
FIG. 2 is a block diagram illustrating example components of a radiation detection system of the system of FIG. 1A.
Figure 17:
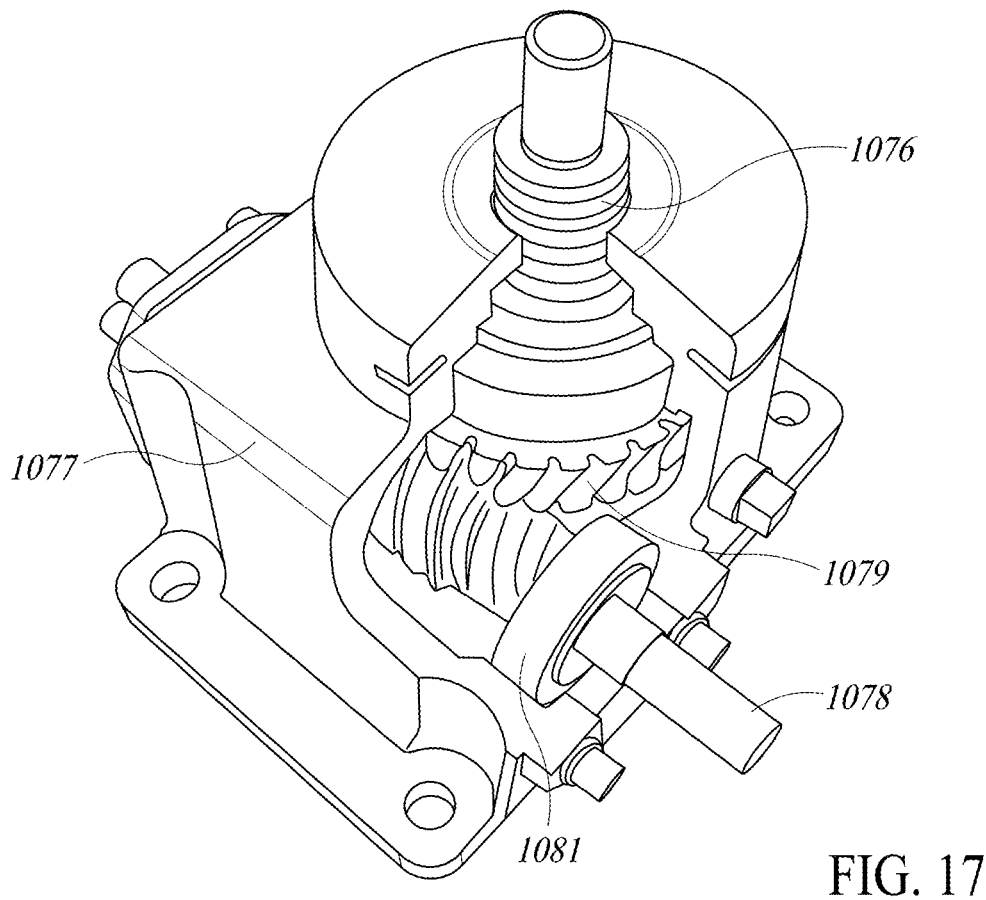

FIG. 17 is a perspective view of a gear box of a screw jack drive train of the radiation detection system of FIG. 2.

Figure 1A:
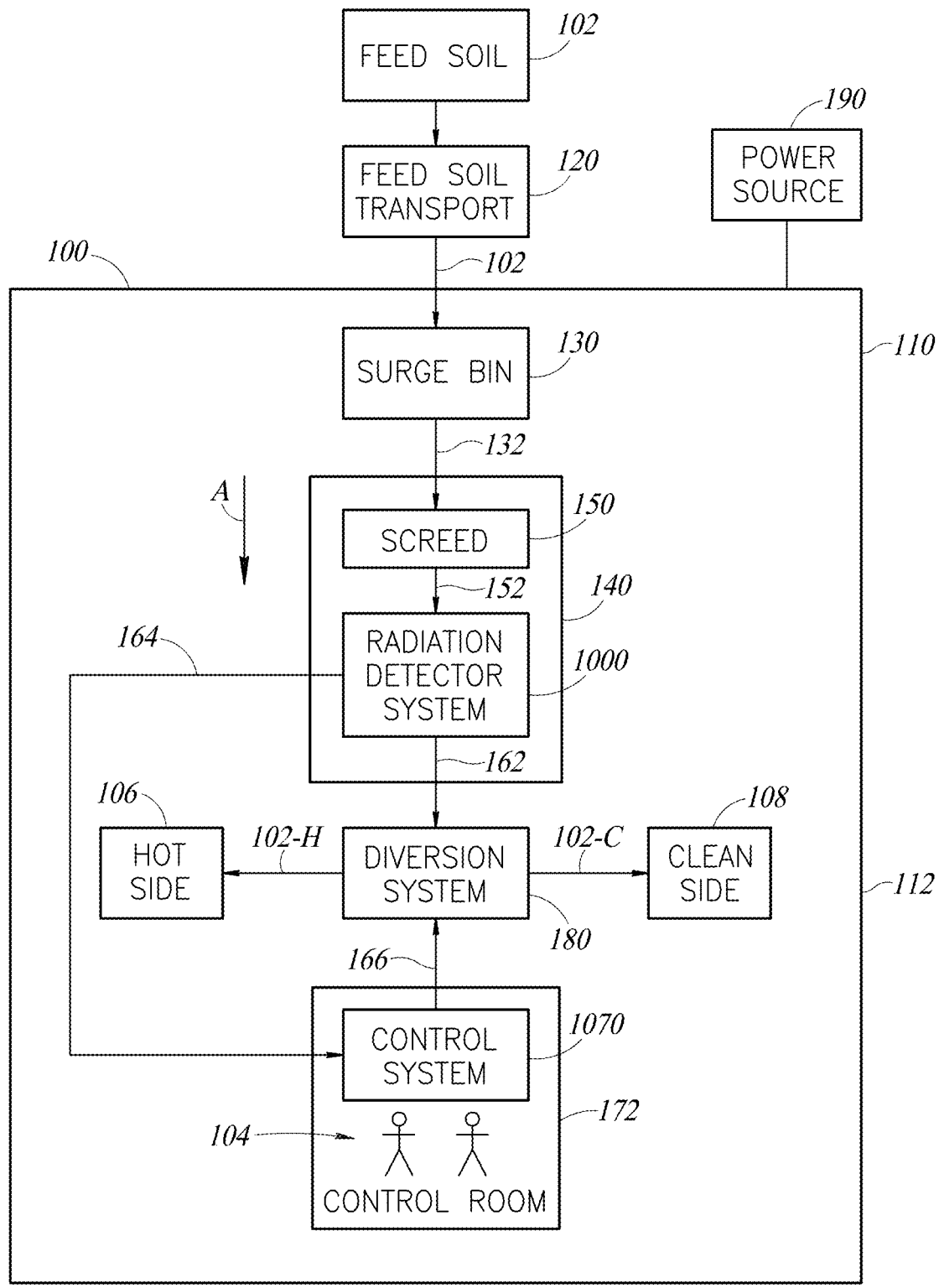
FIG. 1A is a block diagram of an exemplary system for surveying and sorting feed material (e.g., soil) to separate contaminated portions from uncontaminated portions.
Figure 18:
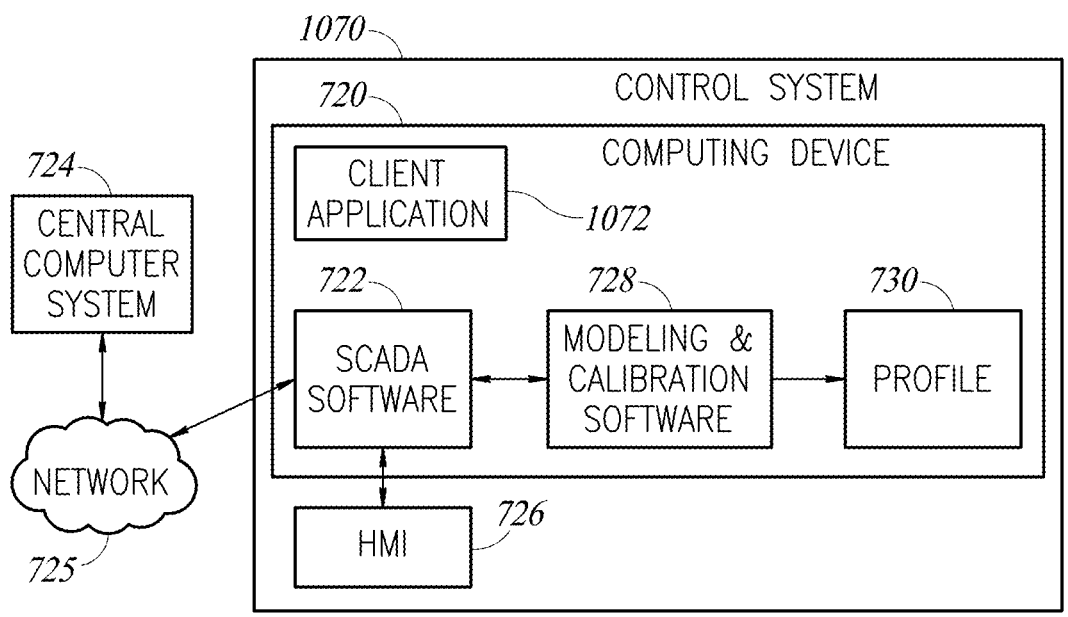

FIG. 18 is a block diagram of a control system subcomponent of the system of FIG. 1A.

Figure 19:
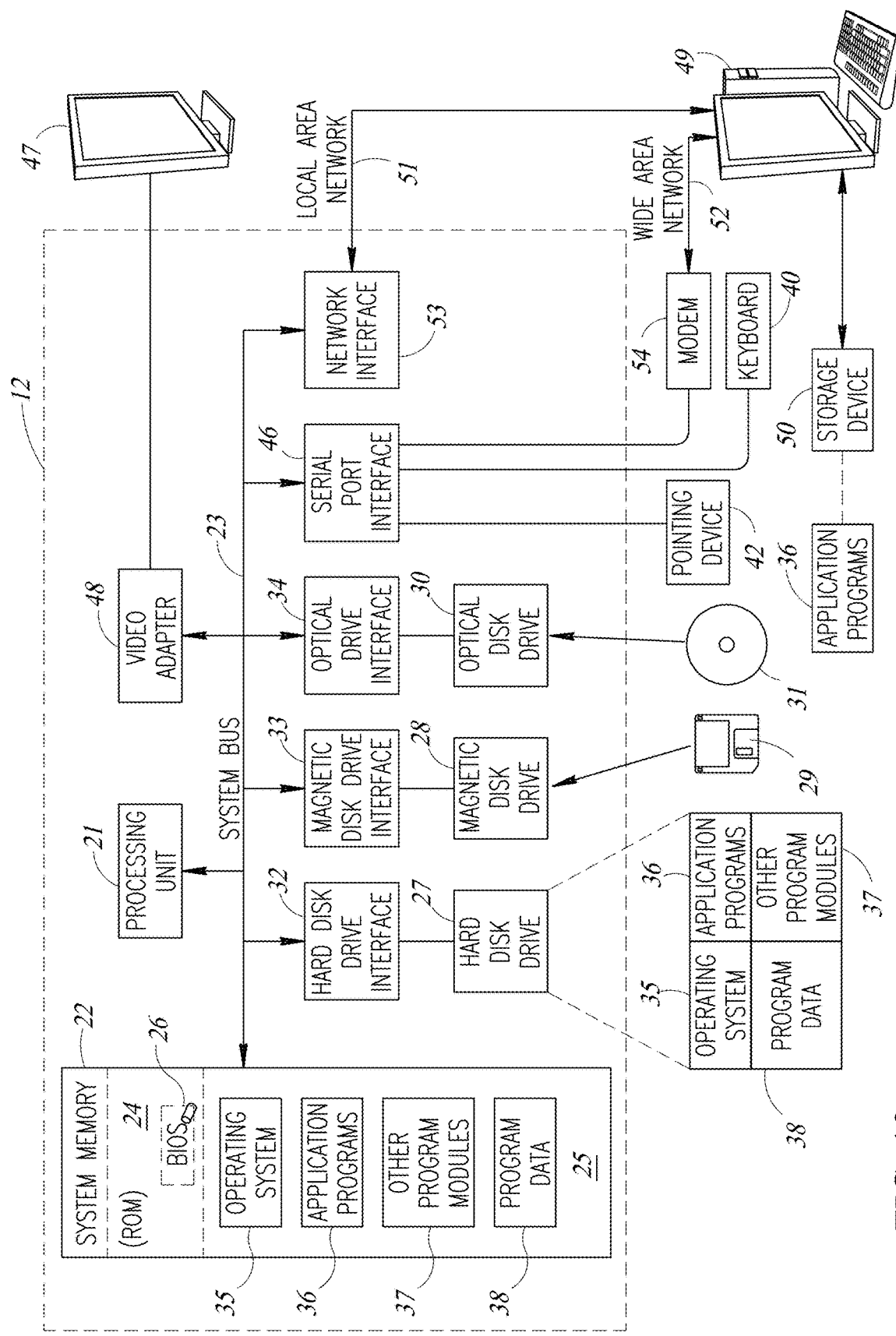

FIG. 19 is a diagram of a hardware environment and an operating environment in which the computing devices of FIG. 18 may be implemented.

Like reference numerals have been used in the figures to identify like components.

DETAILED DESCRIPTION OF THE INVENTION

FIG. 1A is a block diagram of a system 100 configured to survey and sort a feed material (e.g., feed soil 102) to separate contaminated portions (e.g., with one or more radioactive isotopes) from uncontaminated portions of the feed material reproduced. For ease of illustration, the feed material will be described and illustrated as being the feed soil 102. However, the feed material may include materials such as soil, concrete rubble, masonry rubble, ores, ashes, metallic shapes, metallic scraps, vegetable matter, other types of debris, combinations and sub-combinations of the aforementioned materials, and the like. Further, the feed material may be either homogenous or heterogeneous.

The system 100 may be configured to separate soil contaminated with one or more radioactive isotopes from clean or uncontaminated soil by monitoring radioactive energies, if any, emitted by the feed soil 102. Alternatively or additionally, the system 100 may be configured detect other types of soil contamination, such as contamination with elemental species, volatile organic compounds, and other type of materials. The system 100 may be operated by one or more operators 104.

The feed soil 102 enters the system 100 at a first (upstream) end portion 110 and travels toward a second (downstream) end portion 112. At the second (downstream) end portion 112, contaminated portions 102-H of the feed soil 102 exit the system 100 along a "hot" side 106 of the system 100, and uncontaminated or clean portions 102-C of the feed soil 102 exit the system 100 along a "clean" side 108 of the system 100.

The feed soil 102 is supplied to the system 100 by a feed soil transport 120, such as a screen plant, conventional conveyor, earth hauling equipment, and the like. As will be described in further detail below, the system 100 includes a surge bin 130, which receives the feed soil 102 from the feed soil transport 120. The surge bin 130 supplies an initial soil stream 132 to a soil transport mechanism 140. The soil transport mechanism 140 transports the initial soil stream 132 to a screed 150. The screed 150 shapes the initial soil stream 132 into a pre-evaluation soil stream 152. The soil transport mechanism 140 transports the pre-evaluation soil stream 152 past a radiation detection system 1000 configured to collect data about the pre-evaluation soil stream 152. After the radiation detection system 1000 has gathered data about the pre-evaluation soil stream 152, the pre-evaluation soil stream 152 becomes an evaluated soil stream 162. The radiation detection system 1000 transmits information 164 about the pre-evaluation soil stream 152 to a control system 1070, which may optionally be at least partially housed inside a control room 172. The soil transport mechanism 140 transports the evaluated soil stream 162 to a diversion system 180. The control system 1070 sends instructions 166 to the diversion system 180. The instructions 166 direct the diversion system 180 to deposit the contaminated portions 102-H of the evaluated soil stream 162 along the "hot" side 106 of the system 100, and instructs the diversion system 180 to deposit the clean portions 102-C of the evaluated soil stream 162 along the "clean" side 108 of the system 100.

The diversion system 180 may include a single reversible diversion conveyor 182 (see FIG. 1B) that travels in a direction transverse to the soil transport mechanism 140, depositing the contaminated portions 102-H onto a hot side conveyor (not shown), and the clean portions 102-C onto a clean side conveyor (not shown). The reversible diversion conveyor 182 (see FIG. 1B) receives and channels the clean portions 102-C to the clean side conveyor (not shown) and the contaminated portions 102-H to the hot side conveyor (not shown). The clean side conveyor (not shown) may deposit the clean portions 102-C in a "clean" stockpile and the hot side conveyor (not shown) may deposit the contaminated portions 102-H in a "contaminated" stockpile.

As shown in FIG. 1, the system 100 is connected to and receives power from a power source 190. The power source 190 may be a conventional 480 volt, 30 amp service, which is commonly available at many buildings and power poles. By way of another non-limiting example, the power source 190 may be a mobile generator.

Figure 1B:
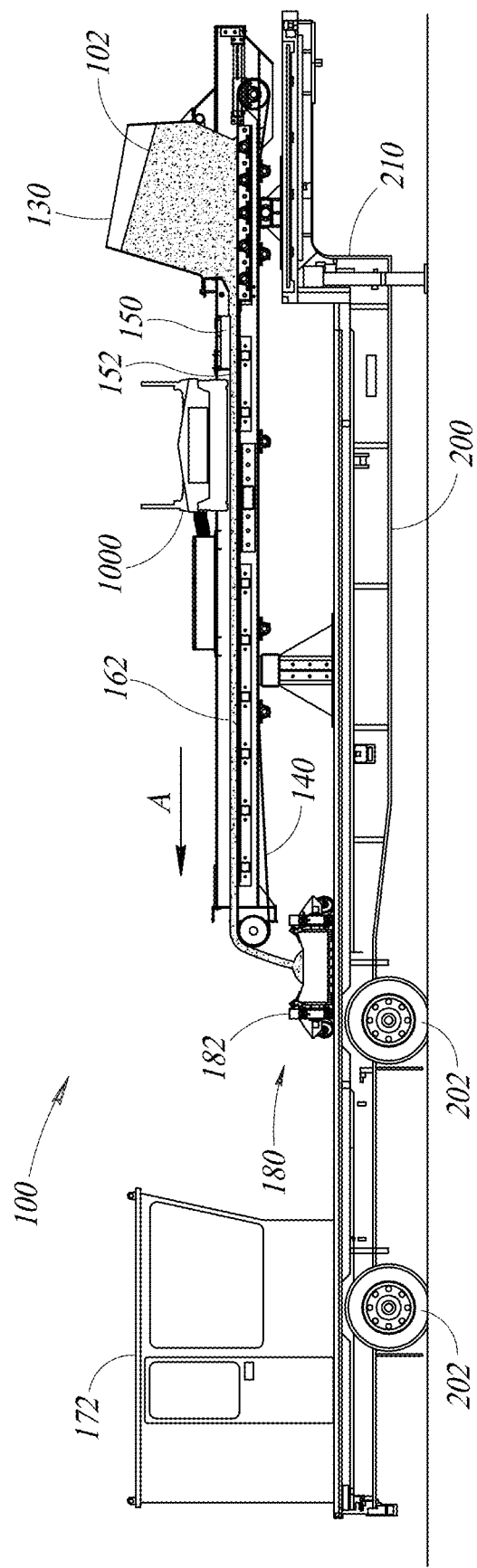
FIG. 1B is a side view of the system of FIG. 1A.

Referring to FIG. 1B, the system 100 may include a frame 200 upon which various system components illustrated in FIG. 1A may be mounted. The system 100 may be mobile or transportable. For example, the frame 200 may be supported by wheels 202. In such embodiments, the system 100 may be implemented on a mobile trailer 210 (e.g., a conventional flatbed trailer). The trailer 210 may be pulled onsite, and hooked up to the power source 190 (see FIG. 1). By way of a non-limiting example, the system 100 may be self-contained and constructed entirely on the trailer 210. By way of a non-limiting example, the trailer 210 may be implemented using a drop-deck trailer with 22.5" wheels. In the embodiment illustrated, the control room 172 is hard-mounted on the trailer 210. While described as being mounted to the frame 200, those of ordinary skill in the art appreciate that one or more of the components of the system 100 may be separate from the frame 200.

FIG. 2 is a block diagram illustrating example components of the radiation detection system 1000. The radiation detection system 1000 is configured to monitor radioactive energy emissions from various elemental contaminants in soil (e.g., the pre-evaluation soil stream 152) and other materials, such as concrete rubble, masonry rubble, ores, ashes (e.g., coal ash), building rubble, metallic pieces, metallic scraps, vegetable matter, and other waste materials and/or debris.

The radiation detection system 1000 includes a detector array 1010 of radiation detectors 1010A-1010H, an array 1020 of photo multiplier tubes ("PMTs") 1020A-1020H, and an array 1030 of multichannel pulse height analyzers ("MCAs") 1030A-1030H. The radiation detection system 1000 is configured to transmit information 1068 (e.g., in the information 164 illustrated in FIG. 1A) to the control system 1070. The control system 1070 is configured to execute a client application 1072 implemented in computer software.

Detector Array

The radiation detectors 1010A-1010H are configured to emit light when exposed to gamma radiation (e.g., a gamma ray 1014). The radiation detectors 1010A-1010H may be implemented as large volume radiation detectors. In the embodiment illustrated, the radiation detectors 1010A-1010H have been implemented as eight large volume sodium iodide (NaI) scintillator detectors. Such scintillating detectors are preferred for performing scanning surveys for several reasons, For example, NaI scintillator detectors may be sensitive, rugged, and require no detector cooling. In such embodiments, each of the radiation detectors 1010A-1010H has a NaI crystal 1012. In general, the larger the NaI crystal, the more gamma rays from a given source will be converted to detector counts. The thickness of the NaI crystal 1012 also affects the efficiency of the absorption of gamma rays of various energies, and thicker NaI crystals are very useful for the detection of prominent high-energy gamma rays. When the gamma ray 1014 enters the NaI crystal 1012 of one of the radiation detectors 1010A-1010H, electronic interactions inside the NaI crystal 1012 can cause light 1016 to be emitted. The light 1016 may be admitted in flashes. The amount of light 1016 emitted (or the number of photons) is proportional to the energy of the gamma ray 1014 absorbed by the NaI crystal 1012. Different radionuclides emit gamma rays having different energies so an amount of energy emitted can be used to identify the radionuclide that emitted the gamma ray 1014. The light 1016 (e.g., emitted as flashes) is detected by the PMTs 1020A-1020H, which may be coupled to the radiation detectors 1010A-1010H, respectively. In other words, the PMTs 1020A-1020H are positioned with respect to the radiation detectors 1010A-1010H, respectively, to detect the light 1016 emitted by the radiation detectors 1010A-1010H, respectively.

By way of a non-limiting example, the radiation detectors 1010A-1010H may be implemented as Mirion-Canberra large-volume 3 inches×5 inches×16 inches NaI(TI) light emitting diode ("LED") temperature-stabilized sodium iodide thallium doped scintillation ("NAIS") radiation detectors. In such embodiments, the LED temperature stabilization feature of the radiation detectors 1010A-1010H eliminates peak-shift issues caused by fluctuations in ambient temperature, and continuously monitors and adjusts the gain of each of the radiation detectors 1010A-1010H automatically to ensure consistent performance throughout an operating temperature range of the system 100 (see FIGS. 1A and 1B). This allows the system 100 (see FIGS. 1A and 1B) to perform nuclide quantification under changing temperature conditions without gain drift.

When the radiation detectors 1010A-1010H are implemented as NAIS detectors, the radiation detection system 1000 is the first use of a cluster or array of NAIS detectors for soil scanning with the soil transport mechanism 140 implemented as an automated conveyor system. Normally, such NAIS detectors are used in personnel monitors, which identify low levels of radioactive contamination present on worker's clothing and bodies. Mirion-Canberra, the creators of the NAIS detectors, compared the NAIS array to an array of high-purity germanium (HPGe) detectors, which are very sensitive and normally used in strict laboratory conditions, and found the NAIS detectors superior for the soil sorting application described herein.

PMTs

As mentioned above, the light 1016 emitted (e.g., as flashes) by each of the radiation detectors 1010A-1010H is detected by the PMTs 1020A-1020H, respectively. The PMTs 1020A-1020H convert the light 1016 to electrical signals or charges 1022 that are transmitted to the MCAs 1030A-1030H, respectively. The electrical charges 1022 encode the light 1016 as electrical pulses. For example, each electrical pulse will have a magnitude or pulse height that corresponds to the amount (or brightness) of at least one of the flashes of the light 1016. The PMTs 1020A-1020H may be implemented as 14-pin type photo multiplier tubes.

The MCA Array

As mentioned above, the electrical charges 1022 encode the light 1016 as electrical pulses that have a height corresponding to the amount (or brightness) of the light 1016. The amount of the light 1016 detected corresponds to an energy of a gamma ray (e.g., the gamma ray 1014) and may be used to identify the radionuclide that emitted the gamma ray. Each of the MCAs 1030A-1030H defines a number of spectrographic regions of interest ("ROI") that each represent a range of energy. Thus, each ROI can collect and monitor the emission characteristics of a different radionuclide.

As mentioned above, the MCAs 1030A-1030H measure the electrical charges 1022 received from the PMTs 1020A-1020H, respectively, and output one or more digital values. For example, each of the MCAs 1030A-1030H may be configured to sort the electrical charges 1022 (e.g., electrical pulses) by height (or magnitude) into corresponding ROIs, count the number of the electrical pulses in each ROI, and output one of the digital value(s) for each ROI. Each of the digital value(s) may be a number of pulses having a predetermined height or within range of heights detected over a period of time. The PMTs 1020A-1020H transmit their digital values in the information 1068 to the client application 1072 (executed by the control system 1070) for analysis. Each of the MCAs 1030A-1030H may accumulate its digital values and use them to form a histogram. Alternatively, each of the MCAs 1030A-1030H may store its accumulated digital values along with a time-stamp corresponding to each of the accumulated digital values. The time-stamp indicates when the corresponding digital value was detected. The information 1068 may include the accumulated digital values, corresponding time-stamps, and/or the histograms. By way of a non-limiting example, the MCAs 1030A-1030H may be implemented as Mirion-Canberra Osprey Multi-Channel Analyzers.

Control System

Referring to FIG. 1A, all of the data collection systems of the system 100 may be connected (via wired or wireless connections) to the control system 1070. Referring to FIG. 18, the control system 1070 includes at least one computing device (e.g., a computing device 720) executing a supervisory control and data acquisition ("SCADA") software program 722 configured to control the soil sorting process. For example, the SCADA software program 722 may instruct a drive motor (not shown) of the reversible diversion conveyor 182 (see FIG. 1B) in which direction to travel. By way of a non-limiting example, the SCADA software program 722 may be implemented using a program named DAQFactory, which is available from Azeotech, Inc. DAQFactory provides a stable, Windows-based interface platform, on which SCADA functionality may be programmed. The SCADA software program 722 may include or have access to the client application 1072.

The SCADA software program 722 may gather and monitor digital information, and log that information on a central computer system 724 connected to the control system 1070 (e.g., via a network 725 such as an Ethernet network). The SCADA software program 722 may perform these functions in real time. The SCADA software program 722 may have one or more programming parameters with values that may be selected or determined by the operators 104 (see FIG. 1A). The SCADA software program 722 may conduct analysis and exercise control based on the values of those programming parameters.

The SCADA software program 722 may be configured to display information in a logical and organized fashion via a human/machine interface ("HMI") 726 (e.g., a monitor or other type of display device). The HMI 726 may be configured to display trend graphs, waterfall graphs, tabular data, and the like. For example, the SCADA software program 722 may be configured to generate one or more histograms of the digital values output by the MCAs 1030A-1030H and instruct the HMI 726 to display the histogram(s).

The computing device 720 executes the one or more modeling and calibration software programs 728 that model(s) detector array geometry, determine(s) energy and efficiency calibration values for the information 1068 (see FIG. 2) coming from the radiation detection system 1000, and provide(s) data to the SCADA software program 722 that the SCADA software program 722 uses to control components of the system 100 (e.g., the diversion system 180). For example, the SCADA software program 722 may instruct the reversible diversion conveyor 182 to travel toward the "hot" side 106 (see FIG. 1A) when the modeling and calibration software programs 728 indicate that an amount of radiation detected by the radiation detection system 1000 exceeds a predetermined amount. Similarly, the SCADA software program 722 may instruct the reversible diversion conveyor 182 to travel toward the "clean" side 108 (see FIG. 1A) when the modeling and calibration software programs 728 indicate that the amount of radiation detected by the radiation detection system 1000 is less than the predetermined amount. Further, the SCADA software program 722 may delay an instruction to travel in a particular direction until the portion of the feed soil 102 evaluated reaches the reversible diversion conveyor 182.

By way of a non-limiting example, the modeling and calibration software programs 728 may include a Genie 2000 Gamma Acquisition and Analysis software package, available from Canberra Industries Inc. This software package includes In-Situ Object Counting System ("ISOCS") software, and Genie-2000 Geometry Composer software.

The modeling and calibration software programs 728 (e.g., the Genie 2000 Gamma Acquisition and Analysis software package) may include or access a characterization profile 730 for the radiation detection system 1000 (see FIGS. 1A and 2) (e.g., an array of NAIS detectors). The characterization profile 730 may be used to identify and account for the properties inherent in the spectroscopy of the radiation detection system 1000 (see FIGS. 1A-2) when compared with other types of detectors (e.g., germanium detectors).

One or more of the computing devices (e.g., the computing device 720 and the central computer system 724) depicted in FIG. 18 may execute the client application 1072. Each of the computing devices (e.g., the computing device 720 and the central computer system 724) depicted in FIG.

18 may be implemented by a computing device 12 descripted below and illustrated in FIG. 19.

Client Application

As mentioned above, referring to FIG. 2, each of the MCAs 1030A-1030H defines a number of spectrographic ROIs that each correspond to a different radionuclide. The client application 1072 executed by the control system 1070 processes the information 1068 received from the array 1030 of the MCAs 1030A-1030H and determines count rates per ROI per second. Each count rate is a total of the individual counts determined by each of the MCAs 1030A-1030H per ROI per second. The client application 1072 considers a particular ROI "active" if the count rate per second determined for the particular ROI is greater than an active threshold (e.g., zero). Otherwise, the particular ROI is considered inactive. The client application 1072 will generate an alarm for an active ROI if the count rate per second for the active ROI exceeds a Remediation Guideline ("RG") threshold, while the client application 1072 may use the count rates determined for other active ROIs strictly for data collection purposes. Each of the MCAs 1030A-1030H and a corresponding one of the radiation detectors 1010A-1010H serve to efficiently detect and bin a wide-range of photon energies into ROIs associated with specific radionuclides of concern ("ROCs") with sufficient resolution to discriminate energies caused simultaneously by ROCs or their photon-emitting daughter progeny.

As mentioned above, the MCAs 1030A-1030H may generate histograms. Alternatively, the client application 1072 may generate the histograms. The client application 1072 may implement a ROI acquisition function that consists of six or more synchronized programmable counters, each with independent energy windows that count events processed by the pulse height analysis ("PHA") function of each of the MCAs 1030A-1030H. The PHA function is a component of acquisition capabilities of the MCAs 1030A-1030H. The client application 1072 acquires energy-correlated data from the detector array 1010 and produces histograms having 256, 512, 1024, 2048, or 4096 bins or channels for a predetermined period of time. Each channel, defined as an energy window, is incremented by one for each event that falls within the window, producing a spectrum that correlates the number of energy events as a function of their amplitude.

The control system 1070 includes one or more processors (e.g., a central processing unit) and computer executable instructions that when executed by the processor(s) cause the processor(s) to implement the client application 1072. Such instructions may be stored in memory of the control system 1070 and/or on one or more non-transitory computer-readable media.

Detector Box Geometry

Figure 4:
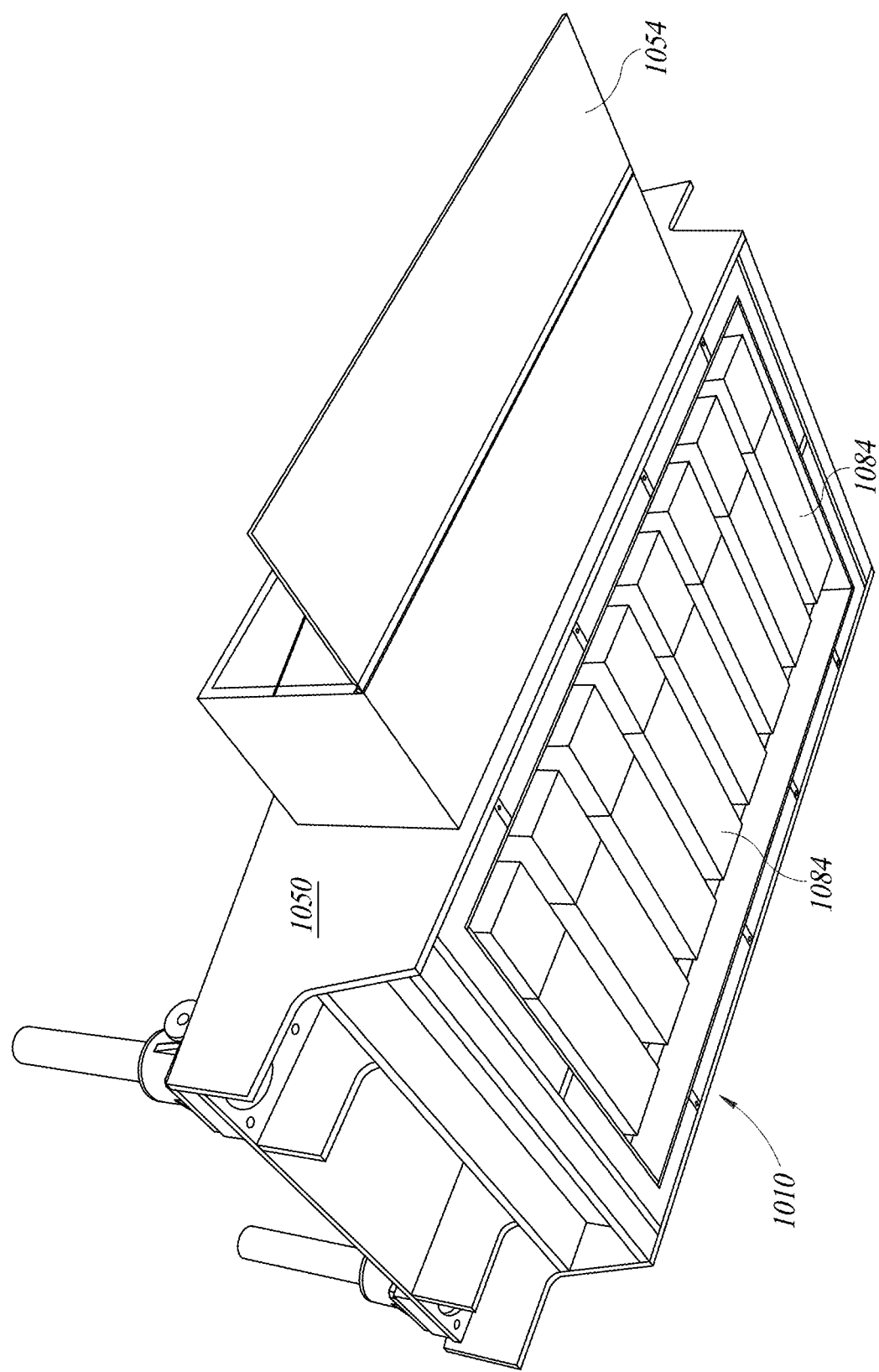
FIG. 4 is a perspective view of an underside of the detector box omitting its titanium window to provide a view of the detector array of FIG. 3.

FIG. 3 is rear side perspective view of a detector box 1050 configured to house the detector array 1010 (see FIGS. 2, 4, and 14). The detector box 1050 may have an MCA enclosure 1052 with a door 1054 which in FIG. 3 is in an open position. The array 1030 is housed inside the MCA enclosure 1052.

Figure 5:
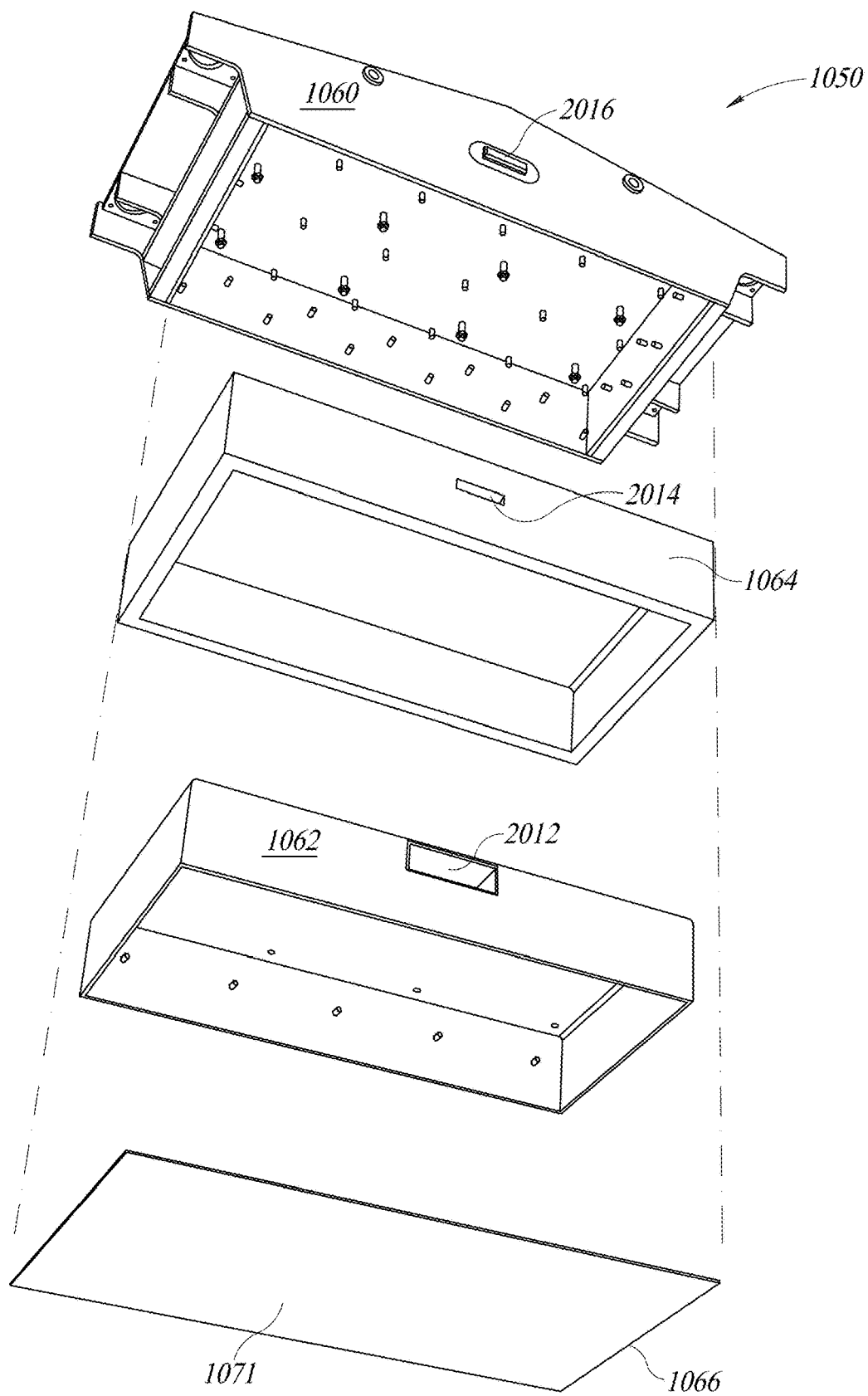
FIG. 5 is an exploded perspective view illustrating some of the components of the detector box of FIG. 3.

FIG. 5 is an exploded perspective view illustrating some of the components of the detector box 1050. These components include an outer shell 1060 (e.g., constructed from ⅝" steel plate), an inner shell 1062 (e.g., constructed from ¼" steel plate), radiation shielding 1064, and a titanium window 1066. Referring to FIG. 15, each of the radiation detectors 1010A-1010H may be attached to the inner shell 1062 by one or more hanger straps 2080. The hanger straps 2080 may be implemented as 3 mm×30 mm carbon fiber hanger straps. The hanger straps 2080 may have through-holes drilled therein to receive supports 2082 (e.g., rods and/or ⅜" low-profile weld nut supports) that couple the hanger straps 2080 to the inner shell 1062.

Referring to FIG. 5, the radiation shielding 1064 (e.g., constructed of a poured lead shield about two-inches thick) is positioned between the outer and inner shells 1060 and 1062 along a roof (or ceiling) and each of the four walls of the outer and inner shells 1060 and 1062. The radiation shielding 1064 is positioned inside the detector box 1050 and is configured to maintain a low background radiation area inside the detector box 1050.

The bottom of the detector box 1050 is closed by the titanium window 1066. The titanium window 1066 defines a downwardly facing outer surface 1071 of the radiation detection system 1000 (see FIGS. 1A and 2). FIG. 4 is a perspective view of the underside of the detector box 1050 omitting its titanium window 1066 (see FIG. 5) to provide a view of the detector array 1010. FIG. 15 is a bottom view of the underside of the detector box 1050 omitting the titanium window 1066 (see FIG. 5). During operation, the titanium window 1066 covers the bottom of the detector box 1050.

Referring to FIG. 3, the detector box 1050 may have a screw jack drive train 1080 positioned on its top side. Motor operated screw jacks 1082A-1082D built on top of the detector box 1050 raise or lower the detector array 1010 (see FIGS. 2, 4, and 14) to the pre-determined final height whereat faces 1084 (see FIGS. 2 and 4) of the radiation detectors 1010A-1010H (see FIGS. 2, 15, and 16) are above the pre-evaluation soil stream 152 (see FIGS. 1A-2, 11, and 16) and define an air gap 1086 (see FIG. 2) between the faces 1084 of the radiation detectors 1010A-1010H and a top surface 1088 (see FIG. 2) of the pre-evaluation soil stream 152.

By way of a non-limiting example, referring to FIG. 2, the air gap 1086 is three quarters of an inch between the detector faces 1084 and the flat top surface 1088 of the pre-evaluation soil stream 152 on the soil transport mechanism 140 (e.g., a conveyor belt). Referring to FIG. 5, the titanium window 1066 may be constructed from titanium sheeting having a thickness of 0.016 inches. The titanium window 1066 is positioned on the bottom of the detector box 1050 and protects the detector array 1010 (see FIGS. 2, 4, and 14) from sharp debris that may be present in the pre-evaluation soil stream 152 (see FIGS. 1A-2, 11, and 16).

Being a dense, high atomic number (or high-Z) material, the titanium window 1066 also produces significant amounts of bremsstrahlung x-rays when exposed to beta radiation, like that emitted from post-WW2-era strontium-90 naval deck and personnel markers prevalent at U.S. Navy waste sites. Referring to FIG. 2, this allows the radiation detection system 1000 to be sensitive to these items and divert them just as the system 100 (see FIGS. 1A and 1B) does for the more common radium-based markers by using the sharply increased signal in the radium progeny region of interest.

Screw Jack Drive Train

Figure 6:
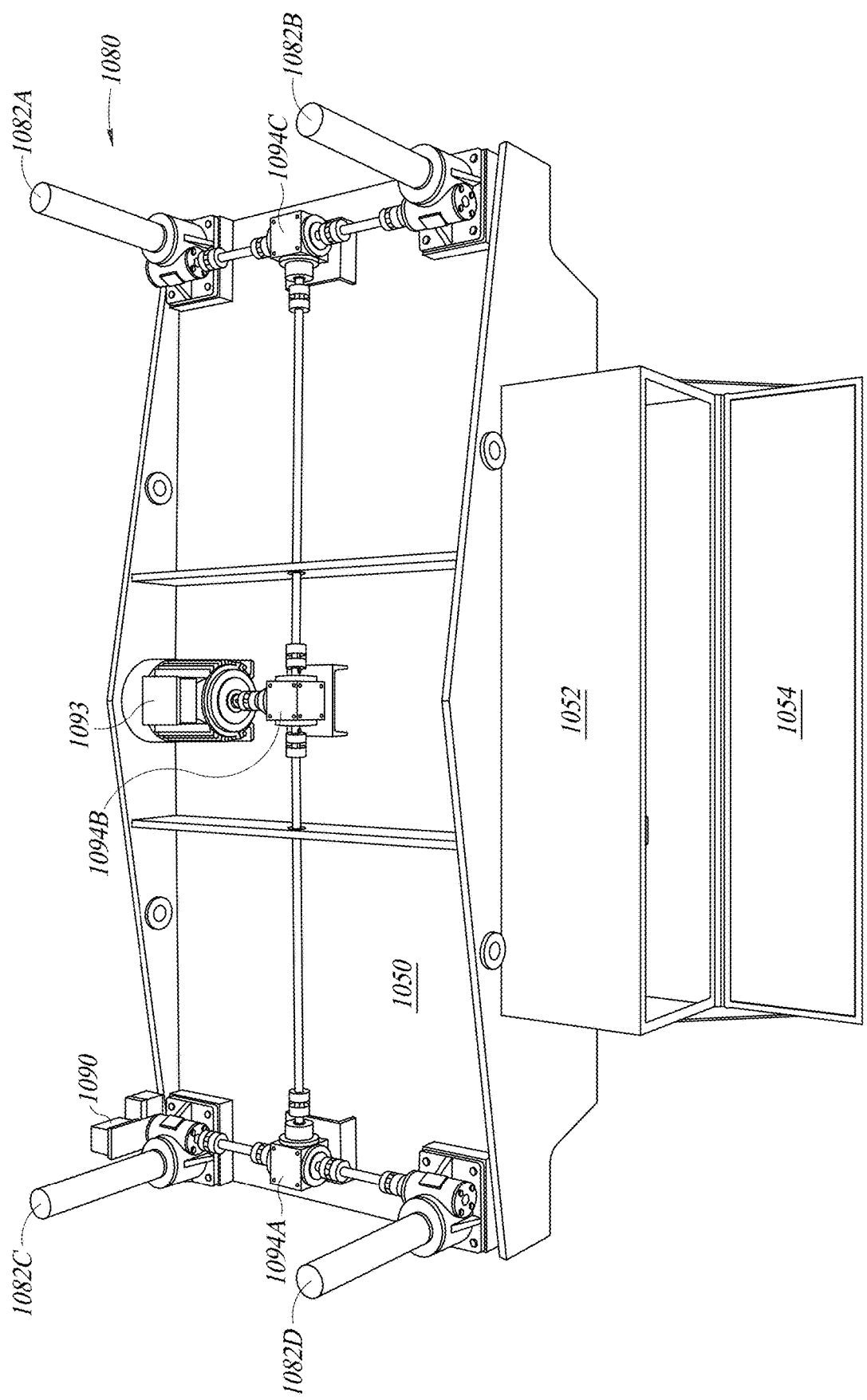
FIG. 6 is a top side perspective view of the detector box of FIG. 3.

FIG. 6 is a top side perspective view of the detector box 1050. Referring to FIG. 6, the screw jack drive train 1080 includes screw jacks 1082A-1082D mounted to the detector box 1050 and configured to adjust the vertical position of the detector array 1010 (see FIGS. 2, 4, and 14) relative to the soil transport mechanism 140 (see FIGS. 1A-2, 11, 12, and 16).

Referring to FIG. 16, in the embodiment illustrated, the screw jacks 1082A-1082D have been implemented as inverted translating machine screw jacks. Each of the screw jacks 1082A-1082D includes a cover 1074, a lift shaft 1076, a gear box 1077, a worm gear 1078 (see FIG. 17), a drive sleeve 1079 (see FIG. 17), and a nut 1081 (see FIG. 17). The covers 1074 are fixed in place and help protect the lift shafts 1076 from dirt, rust, and foreign debris.

In each of the screw jacks 1082A-1082D, the lift shaft 1076 extends outwardly from both the top and bottom of the gear box 1077 and moves linearly upwardly and downwardly through the gear box 1077. At the top of the gear box 1077, the lift shaft 1076 may be housed inside the cover 1074. Referring to FIG. 17, the gear box 1077 houses the worm gear 1078 that drives the drive sleeve 1079. The worm gear 1078 may be constructed of a steel alloy and the drive sleeve 1079 may be constructed of bronze (e.g., a high strength bronze alloy). The nut 1081 is integrated with the worm gear 1078 such that the worm gear 1078 and the nut 1081 rotate together.

Referring to FIG. 16, the lower end of the lift shaft 1076 is non-rotatably attached (e.g., bolted) to a side portion of the soil transport mechanism 140 by a base plate or flange 1083. The flange 1083 prevents the lift shaft 1076 from rotating with respect to the soil transport mechanism 140 and causes the lift shaft 1076 to move linearly through the drive sleeve 1079 (see FIG. 17), which raises or lowers the detector box 1050 as the lift shaft 1076 threads upwardly or downwardly, respectively, with respect to the drive sleeve 1079.

The screw jacks 1082A-1082D may each be implemented as a five-ton screw jack, such as a five-ton inverted translating work gear screw jack with 24:1 ratio.

Figure 11:
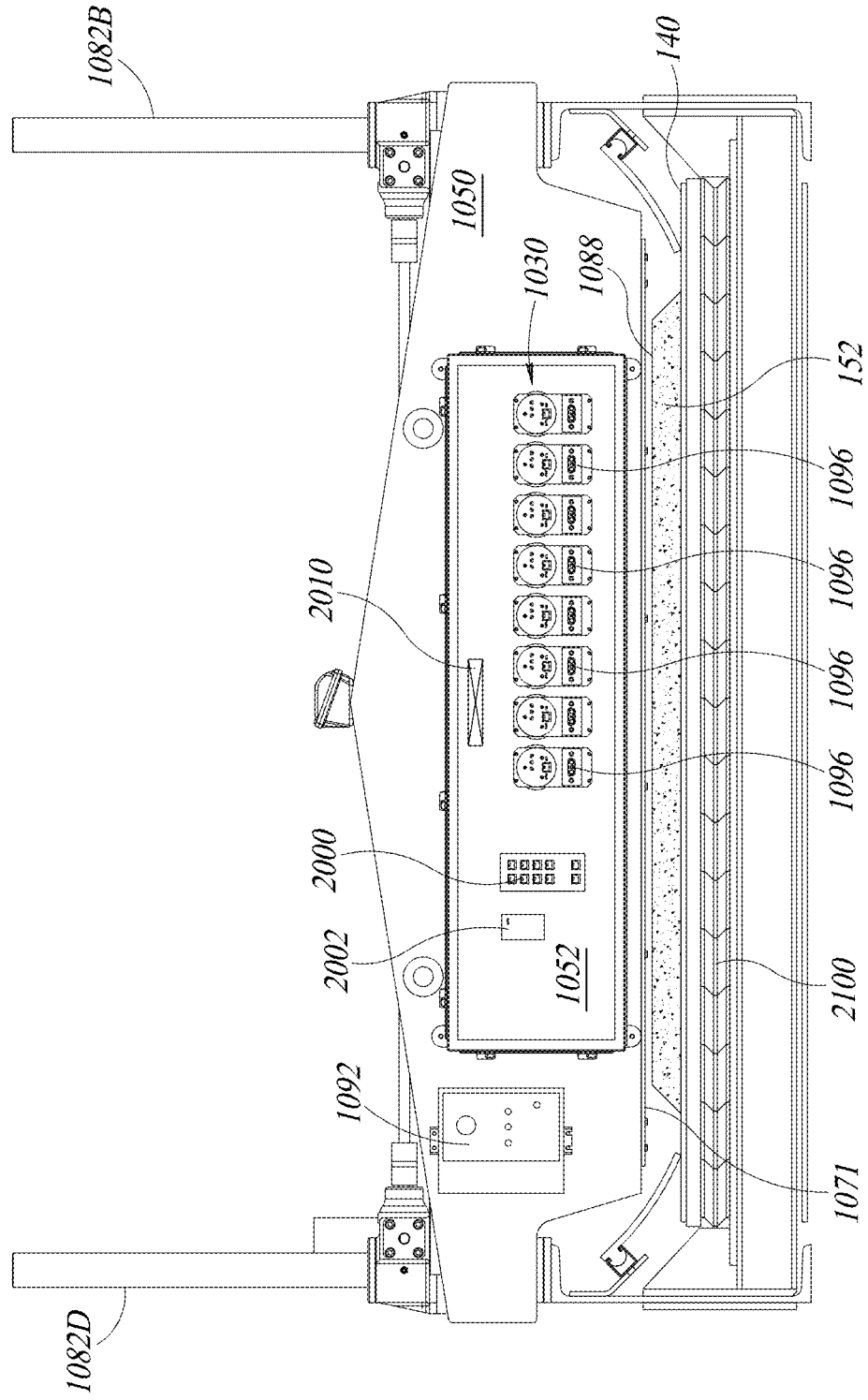
FIG. 11 is a rear view of the detector box of FIG. 3 positioned above a soil transport mechanism (e.g., a conveyor).
Figure 12:
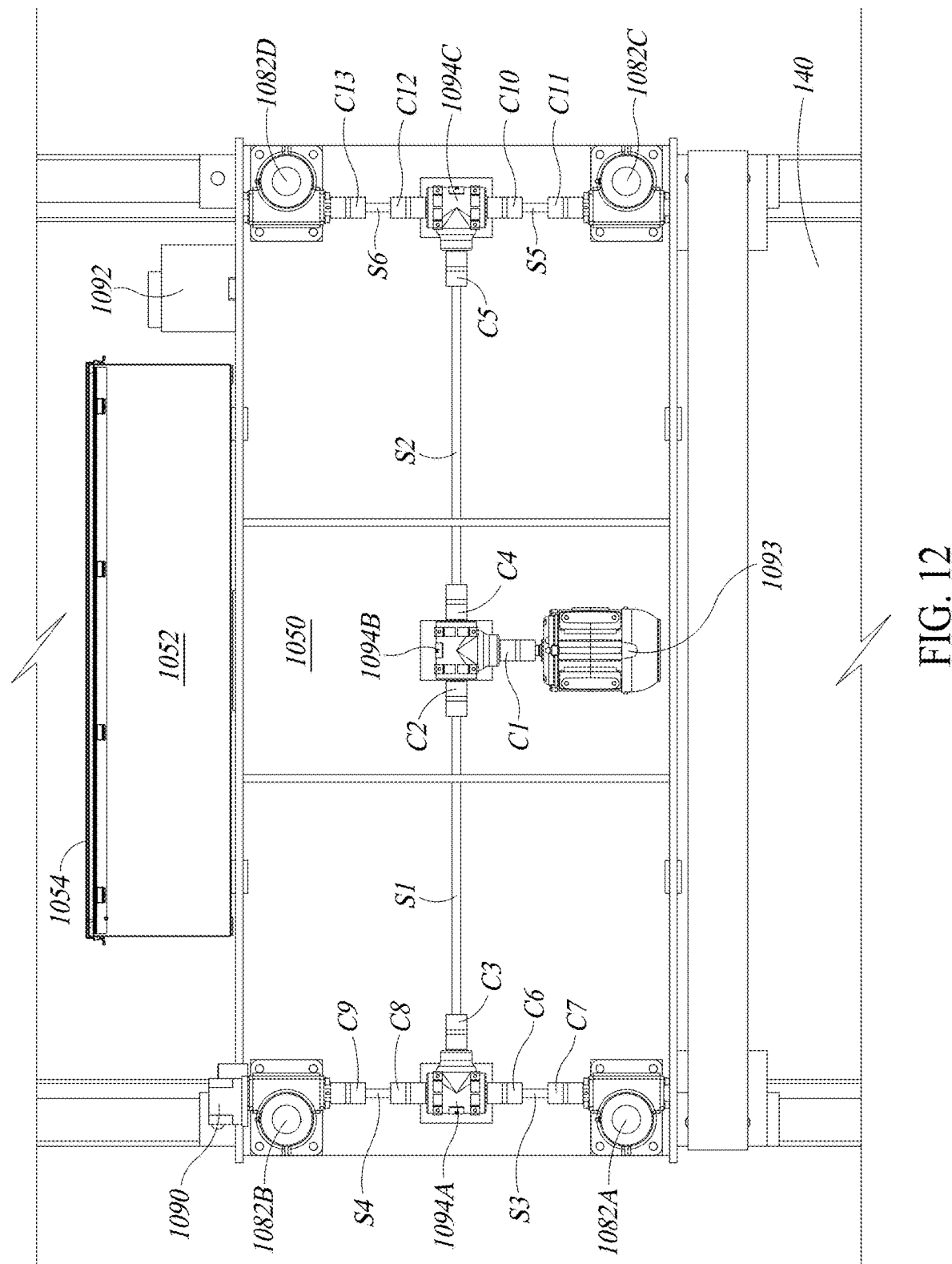
FIG. 12 is a top view of the detector box of FIG. 3.

The worm gear 1078 (see FIG. 17) of each of the screw jacks 1082A-1082D is rotated relative to the gear box 1077 by a variable frequency drive 1092 (see FIGS. 11, 12, and 15). One of the screw jacks 1082A-1082D (e.g., the screw jack 1082C) is equipped with a limit switch 1090 that prevents the variable frequency drive 1092 from causing the lift shafts 1076 to over-run the drive sleeves 1079 when raising the radiation detection system 1000 (see FIGS. 1A-2).

FIG. 12 is a top view of the detector box 1050 positioned above the soil transport mechanism 140. Referring to FIG. 12, the variable frequency drive 1092 is configured to drive a motor 1093. By way of a non-limiting example, the motor 1093 may be implemented as a 1½ horsepower inverter duty electric motor. The motor 1093 turns linked shafting inside miter boxes 1094A-1094C, via shafts S1 and S2 and couplings C1-C5. In the example illustrated, the motor 1093 is coupled to the miter box 1094B by the coupling C1. The motor 1093 rotates the shafting inside miter box 1094B, which rotates shafts S1 and S2. The ends of the shaft S1 are coupled to the shafting inside miter boxes 1094B and 1094A by the couplings C2 and C3, respectively. When the shaft S1 is rotated by the shafting inside miter box 1094B, the shaft S1 causes the shafting inside miter box 1094A to rotate.

The ends of the shaft S3 are coupled to the shafting inside miter box 1094A and the worm gear 1078 (see FIG. 17) of the screw jack 1082A by the couplings C6 and C7, respectively. The ends of the shaft S4 are coupled to the shafting inside miter box 1094A and the worm gear 1078 of the screw jack 1082B by the couplings C8 and C9, respectively. When the shafting inside miter box 1094A is rotating, the shafting inside miter box 1094A rotates shafts S3 and S4. The shafts S3 and S4 are connected to the worm gears 1078 (see FIG. 17) of the screw jacks 1082A and 1082B, respectively by the couplings C7 and C9, respectively. Thus, when the shafts S3 and S4 rotate they cause the worm gears 1078 of the screw jacks 1082A and 1082B, respectively, to rotate which causes the drives sleeves 1079 (see FIG. 17) of the screw jacks 1082A and 1082B, respectively, to rotate and ultimately causes the lift shafts 1076 (see FIGS. 16 and 17) to raise or lower the detector box 1050.

The ends of the shaft S2 are coupled to the shafting inside miter boxes 1094B and 1094C by the couplings C4 and C5, respectively. When the shaft S2 is rotated by the shafting inside miter box 1094B, the shaft S2 causes the shafting inside miter box 1094C to rotate. The ends of the shaft S5 are coupled to the shafting inside miter box 1094C and the worm gear 1078 (see FIG. 17) of the screw jack 1082C by the couplings C10 and C11, respectively. The ends of the shaft S6 are coupled to the shafting inside miter box 1094C and the worm gear 1078 of the screw jack 1082D by the couplings C12 and C13, respectively. When the shafting inside miter box 1094C is rotating, the shafting inside miter box 1094C rotates shafts S5 and S6. The shafts S5 and S6 are connected to the worm gear 1078 of the screw jacks 1082C and 1082D, respectively, by the couplings C11 and C13, respectively. Thus, when the shafts S5 and S6 rotate, they cause the worm gears 1078 of the screw jacks 1082C and 1082D, respectively, to rotate. The shafts S1-S6 may be implemented as ½" line shafting.

The couplings C1-C13 may each be implemented as a jaw type flex coupling. Rotation of the motor 1093 in a clockwise direction or a counterclockwise direction will raise or lower the detector box 1050 above the soil transport mechanism 140 (e.g., conveyor belt) to which the detector box 1050 is mounted.

System Power

Figure 7:
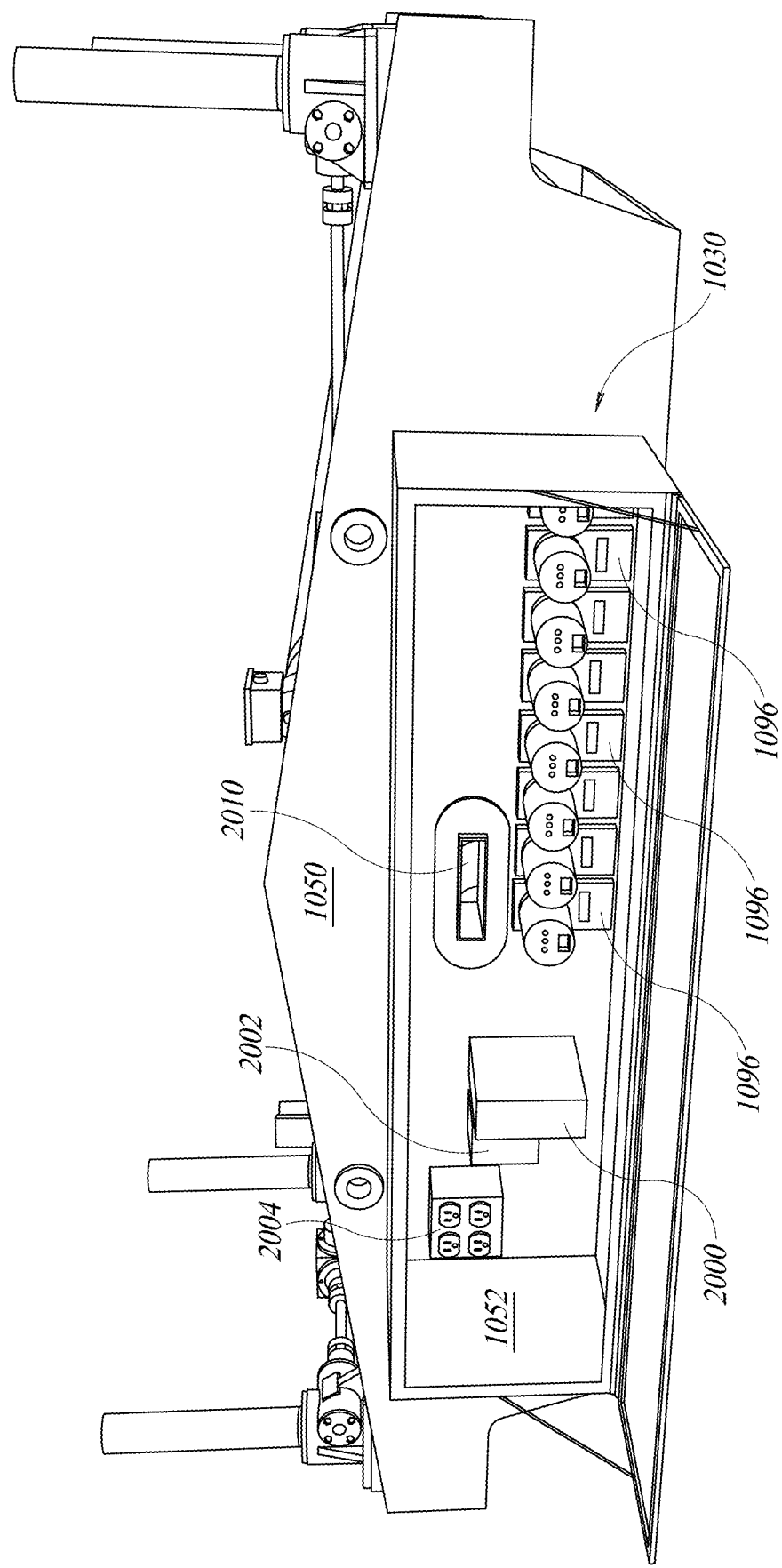
FIG. 7 is a rear side perspective view of the detector box of FIG. 3 showing an interior of a multichannel pulse height analyzer enclosure.

FIG. 7 is a rear side perspective view of the detector box 1050 showing the interior of the MCA enclosure 1052. Referring to FIG. 7, the array 1030 is mounted inside the MCA enclosure 1052 whereat the MCAs 1030A-1030H (see FIG. 2) are each mounted to a different adapter 1096 (e.g., an OPSNAIS adapter). Each of the MCAs 1030A-1030H (see FIG. 2) in the array 1030 receives power from a power-over-Ethernet ("POE") compliant device 2000 commonly referred to as an Ethernet switch. The POE compliant device 2000 has a power supply 2002 and is connected to an Ethernet network by an Ethernet port (not shown). The Ethernet port (not shown) may be implemented as a 10/100T Ethernet port. The POE compliant device 2000 receives power from the power supply 2002 and supplies that power to the array 1030. The MCAs 1030A-1030H (see FIG. 2) may be accessed through communication with the control system 1070 (see FIGS. 1A, 2, and 18) and through the Ethernet port (not shown) on the POE compliant device 2000. The Ethernet port (not shown) connects the MCAs 1030A-1030H (see FIG. 2) directly to the control system 1070 (see FIGS. 1A, 2, and 18). By way of a non-limiting example, a default static IP network connection to the array 1030 uses a network connection to the Ethernet controller through Internet Protocol Version 4 (TCP/IPv4). The MCA enclosure 1052 may include an electrical plug-in receptacle 2004. Wiring (not shown) from the MCAs 1030A-1030H (see FIG. 2) to the radiation detectors 1010A-1010H (see FIGS. 2, 15, and 16) passes through a cable chase or raceway 2010 that opens into the MCA enclosure 1052. In the embodiment illustrated, the raceway 2010 is positioned above the array 1030. The raceway 2010 may be one inch tall by six inches wide.

The Wiring Raceway

Referring to FIG. 5, the radiation shielding 1064 is open along its bottom portion to allow radiation (e.g., the gamma ray 1014 illustrated in FIG. 2) to reach the detector array 1010 (see FIGS. 2, 4, and 14). The radiation shielding 1064 positioned inside the outer shell 1060 of the detector box 1050 demands that there be no opening that could allow stray gamma ray photons to enter the inner shell 1062 except from underneath the detector array 1010 (see FIGS. 2, 4, and 14). Since the detector box 1050 is sealed at the bottom by the titanium window 1066, the detector box 1050 includes the raceway 2010 (see FIGS. 7, 11, 14, and 15) that allows communication wiring (not shown) to be routed from outside the outer shell 1060 (through the radiation shielding 1064) to inside the inner shell 1062 and vice versa. The design of the raceway 2010 (see FIGS. 7, 11, 14, and 15) does not allow gamma photons to enter the detector box 1050 without being shielded by the radiation shielding 1064 (e.g., at least two inches of lead). The raceway 2010 includes an inner through-hole 2012 formed in the inner shell 1062, a shielding through-hole 2014 formed in the radiation shielding 1064, and an outer through-hole 2016 formed in the outer shell 1060.

Figure 8:
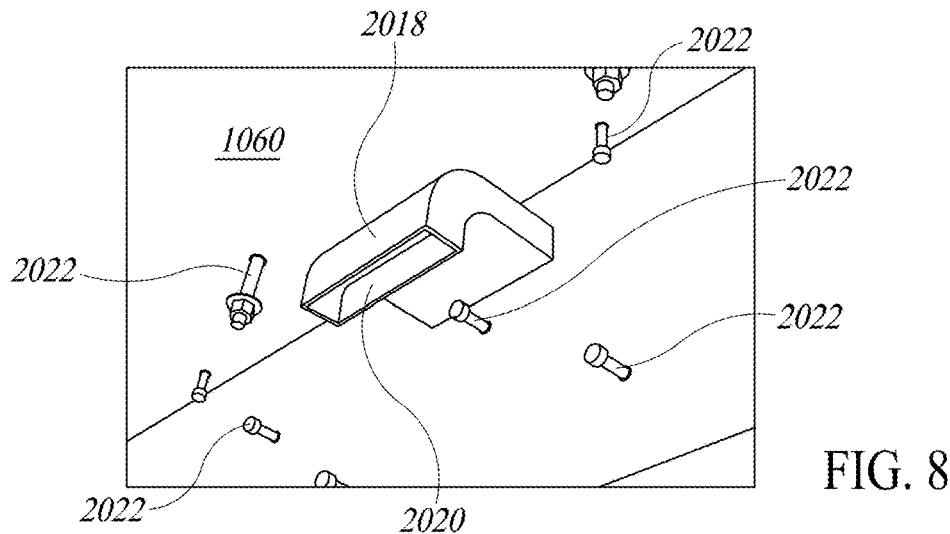
FIG. 8 is an enlarged view of an interior of an outer shell of the detector box of FIG. 3.

FIG. 8 is an enlarged view of the interior of the outer shell 1060. Referring to FIG. 8, a curved raceway member 2018 is formed in or attached to the outer shell 1060. The curved raceway member 2018 extends inward linearly from the outer shell 1060 then curves downwardly. In the embodiment illustrated, the curved raceway member 2018 is generally J-shaped. The curved raceway member 2018 has an open ended through-channel 2020 formed therein with the outer through-hole 2016 (see FIG. 5) being one of the openings into the open ended through-channel 2020. In this manner, the curved raceway member 2018 forms a seal around the outer through-hole 2016 inside the outer shell 1060.

FIG. 8 illustrates a plurality of anchor studs 2022 welded to the inside walls and ceiling of the outer shell 1060. Referring to FIG. 5, in embodiments in which the radiation shielding 1064 is poured, the anchor studs 2022 anchor the radiation shielding 1064 to the outer shell 1060 when the radiation shielding 1064 is poured. The curved raceway member 2018 (see FIG. 8) may be constructed from steel and encased in the radiation shielding 1064.

Figure 9:
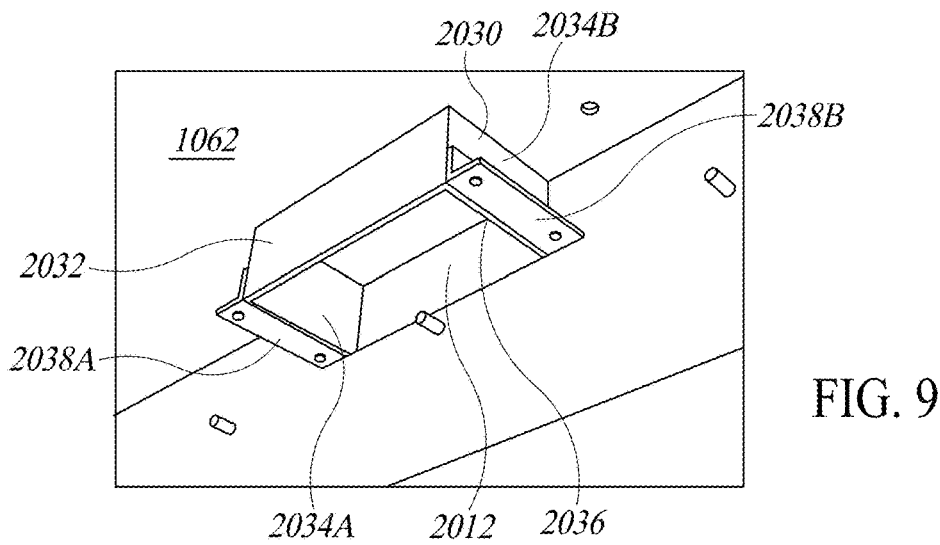
FIG. 9 is an enlarged view of an interior of an inner shell of the detector box of FIG. 3.

FIG. 9 is an enlarged view of the interior of the inner shell 1062. Referring to FIG. 9, the inner shell 1062 includes a labyrinth 2030. In the embodiment illustrated, the labyrinth 2030 is generally C-shaped with an intermediate portion 2032 flanked by parallel first and second side portions 2034A and 2034B that extend outwardly from the intermediate portion 2032 in the same direction. The first and second side portions 2034A and 2034B are attached to the wall of the inner shell 1062 along opposite sides of the inner through-hole 2012. In the embodiment illustrated, the intermediate portion 2032 is spaced inwardly from the inner through-hole 2012 by the first and second side portions 2034A and 2034B. The labyrinth 2030 extends upwardly and contacts the roof of the inner shell 1062. Thus, together the labyrinth 2030 and the roof of the inner shell 1062 may be characterized as forming a cup or bowl that includes a lower opening 2036 that opens downwardly into the inner shell 1062 and has the inner through-hole 2012 formed in its side. Flanges 2038A and 2038B extend outwardly from the first and second side portions 2034A and 2034B, respectively. The flanges 2038A and 2038B extend away from and are flush with the lower opening 2036. In the embodiment illustrated, each of the flanges 2038A and 2038B includes one or more through-holes.

Figure 10:
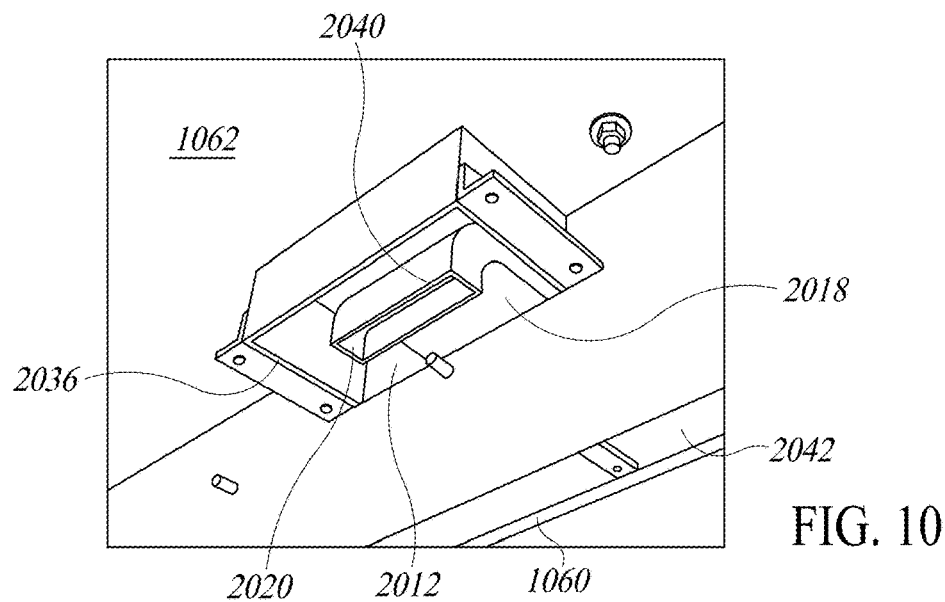
FIG. 10 is an enlarged view of the inner shell positioned inside the outer shell of the detector box of FIG. 3.

FIG. 10 is an enlarged view of the inner shell 1062 positioned inside the outer shell 1060. Referring to FIG. 10, the curved raceway member 2018 is configured to extend through the inner through-hole 2012 and has an inner portion 2040 configured to be flush with the lower opening 2036. An opening into the through-channel 2020 is formed in the inner portion 2040. A cover or blank (not shown) may be temporarily coupled to the flanges 2038A and 2038B to close the lower opening 2036. The blank (not shown) may be temporarily coupled to each of the flanges 2038A and 2038B by one or more fasteners (e.g., bolts, screws, and the like) configured to be received by the through-hole(s) formed in the flanges 2038A and 2038B. When coupled to the flanges 2038A and 2038B, the blank (not shown) closes the opening formed in the inner portion 2040. In embodiments in which the radiation shielding 1064 is poured, the outer and inner shells 1060 and 1062 may be assembled as illustrated in FIG. 10. Then, the outer and inner shells 1060 and 1062 may be positioned in an upside-down orientation so that the lower opening 2036 opens upwardly. Next, the blank (not shown) is temporarily coupled to the flanges 2038A and 2038B and closes both the lower opening 2036 and the opening formed in the inner portion 2040. Then, the radiation shielding 1064 may be poured into a gap 2042 defined between the outer and inner shells 1060 and 1062. The poured material will flow within the gap 2042 around the curved raceway member 2018, enter the inner through-hole 2012, and pool inside the bowl defined by the labyrinth 2030 and the roof of the inner shell 1062. The blank (not shown) prevents the poured material from entering the inner shell 1062 beyond the bowl because the blank closes the lower opening 2036. The poured material will not enter the through-channel 2020 because the blank (not shown) closes the opening formed in the inner portion 2040. In this manner, the curved raceway member 2018 is entirely embedded in the radiation shielding 1064 and the through-channel 2020 extends from outside the outer shell 1060 to inside the inner shell 1062 and allows wiring (not shown) to extend therethrough. Referring to FIG. 15, a heat insulating layer 2090 (e.g., Styrofoam) may be positioned along (e.g., glued to) the inside of the inner shell 1062. The heat insulating layer 2090 may be about ½ inches thick.

Shadow Shield Assembly

FIG. 11 is a rear view of the detector box 1050 positioned above the soil transport mechanism 140. Referring to FIG. 11, embodiments in which the soil transport mechanism 140 is implemented as a conveyor may include a shadow shield assembly 2100 positioned below the detector box 1050 and under the belting of the conveyor. FIG. 13 is a top view of the shadow shield assembly 2100. Referring to FIGS. 13 and 14, the shadow shield assembly 2100 may include a plate 2102, a frame 2104, and shielding 2106. The plate 2102 may be implemented as a ½-inch steel plate and the frame 2104 may be implemented as an I-beam system. The frame 2104 supports the shielding 2106, which may be implemented as a 2-inch thick layer of interlocking lead bricks. The frame 2104 may include end plates 2111-2114 (e.g., ⅜" thick), gusset plates 2115 (e.g., ⅜" thick), I-beam components 2116 (e.g., W4×13), side plates 2117A and 2117B (e.g., ½" thick), and a retaining angle component 2120. The retaining angle component 2120 may be constructed from 2 inches×2 inches×¼ inches steel. By way of a non-limiting example, the shielding 2106 may be implemented as 2 inches×4 inches×12 inches interlocking lead bricks glued in place to the plate 2102.

FIGS. 14 and 16 are each a cross-sectional view of the detector box 1050 positioned above the shadow shield assembly 2100, which is below the soil transport mechanism 140. Referring to FIG. 16, in the embodiment illustrated, the shadow shield assembly 2100 is positioned between a portion 2140 of the conveyor belt currently transporting the pre-evaluation soil stream 152 and a return portion 2142 of the conveyor belt. The shadow shield assembly 2100 creates a wide 'shadow shield' under the detector array 1010 (see FIGS. 2, 4, and 14). The shadow shield assembly 2100 may be configured to virtually eliminate radiation shine from surrounding structures, which could include radiation shine from the soil and other materials below the system 100 (see FIGS. 1A and 1B) and from any nearby soil piles. Used together, the shadow shield assembly 2100 and the radiation shielding 1064 of the detector box 1050 create an ultra-low background environment for the detector array 1010 (see FIGS. 2, 4, and 14).

Computing Device

FIG. 19 is a diagram of hardware and an operating environment in conjunction with which implementations of the one or more computing devices of the system 100 may be practiced. The description of FIG. 19 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 8 includes a general-purpose computing device in the form of the computing device 12. Each of the computing devices of FIG. 18 (including the computing device 720 and the central computer system 724) may be substantially identical to the computing device 12 or implemented as embodiments thereof. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feed back game controller).

The input devices described above are operable to receive user input and selections. Together the input and display devices may be described as providing a user interface. Further, the HMI 726 may include any of the components of the user interface, as well as the monitor 47 or other type of display device.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 19 include a local-area network (LAN) 51 and a wide-area network (WAN) 52. Such networking environments are commonplace in offices, enterprise-wide computer networks, intranets and the Internet. The network 725 (see FIG. 18) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A radiation detection system comprising:
an enclosure comprising an outer shell, an inner shell, and radiation shielding positioned between the outer shell and the inner shell, the radiation shielding comprising an opening, the inner shell comprising a hollow interior, a curved raceway to extend through the outer shell, the inner shell, and the radiation shielding to allow one or more wires to extend through the curved raceway between the hollow interior and outside the outer shell;
a plurality of radiation detectors each to emit light when exposed to radiation, the plurality of radiation detectors being housed together inside the hollow interior of the inner shell, the radiation shielding to limit exposure of the plurality of radiation detectors to radiation other than through the opening;
at least one photo multiplier tube to convert the light emitted by any of the plurality of radiation detectors into an electrical signal encoding an amount of light; and
at least one pulse height analyzer to output at least one value associated with an amount of radiation detected based at least in part on the electrical signal.

2. The radiation detection system of claim 1, wherein the plurality of radiation detectors comprises an array of sodium iodide thallium doped scintillation radiation detectors.

3. The radiation detection system of claim 1, wherein the plurality of radiation detectors are to each emit the light as flashes and the electrical signal is to include electrical pulses encoding the amount of light present in the flashes.

4. The radiation detection system of claim 3, wherein each of the electrical pulses has a magnitude or pulse height that corresponds to and encodes the amount of light present in at least one of the flashes.

5. The radiation detection system of claim 4, wherein the at least one value output by the pulse height analyzer comprises a number of electrical pulses having a predetermined height or being within range of heights detected over a period of time.

6. The radiation detection system of claim 4, wherein the at least one value comprises region values, and
the at least one pulse height analyzer is to sort the electrical pulses by the pulse height into regions of interest, count a number of the electrical pulses in each of the regions of interest within a unit of time, and output one of the region values for each of the regions of interest.

7. The radiation detection system of claim 6, wherein each of the regions of interest is associated with a different radionuclide.

8. The radiation detection system of claim 1, wherein the radiation detection system is comprised in a system comprising:
a conveyor belt having a transport portion and a return portion, the transport portion to carry materials passed the plurality of radiation detectors; and
a shadow shield assembly positioned between the transport portion and the return portion, the shadow shield assembly to reduce radiation shine originating from below the conveyor belt.

9. The radiation detection system of claim 1, wherein the at least one photo multiplier tube, and the at least one pulse height analyzer are housed inside the hollow interior of the inner shell with the plurality of radiation detectors.

10. A system comprising:
a material transport system comprising a main conveyor and a diversion system, the main conveyor to transport one or more materials to the diversion system, the diversion system to transport contaminated and uncontaminated portions of the one or more materials to first and second locations, respectively;
an assembly housing a radiation detection system comprising a plurality of radiation detectors, at least one photo multiplier tube, and at least one pulse height analyzer, the assembly comprising an outer shell, an inner shell, and radiation shielding comprising an opening adjacent the main conveyor, each of plurality of radiation detectors, the at least one photo multiplier tube, and the at least one pulse height analyzer being at least partially positioned inside the inner shell with the plurality of radiation detectors being adjacent the opening, the main conveyor to transport the one or more materials under the radiation detection system, the radiation shielding being positioned between the outer shell and the inner shell to shield the plurality of radiation detectors from radiation originating from other than the one or more materials, a curved raceway to extend through the outer shell, the inner shell, and the radiation shielding to allow one or more wires to extend from outside the outer shell through the curved raceway to the plurality of radiation detectors, each of the plurality of radiation detectors to emit light when a sufficiently radioactive portion of the one or more materials passes under the radiation detector, the at least one photo multiplier tube to convert received light emitted by any of the plurality of radiation detectors into an electrical signal encoding an amount of the light, and the at least one pulse height analyzer to output at least one value associated with an amount of radiation detected based at least in part on the electrical signal; and
a control system connected to the radiation detection system and the diversion system, the control system to determine when the amount of radiation detected exceeds a threshold value and instruct the diversion system to transport a portion of the one or more materials to the first location when the control system determines the amount of radiation detected exceeds the threshold value.

11. The system of claim 10, wherein the plurality of radiation detectors comprises an array of sodium iodide thallium doped scintillation radiation detectors.

12. The system of claim 10, wherein the main conveyor comprises a belt having a transport portion and a return portion, and the system further comprises:
a shadow shield assembly positioned between the transport portion and the return portion, the shadow shield assembly to reduce radiation shine originating from below the main conveyor.

13. The system of claim 10, wherein the at least one value comprises region values,
a particular one of the plurality of radiation detectors emits emitted light as flashes,
the at least one photo multiplier tube is to convert the emitted light into a particular electrical signal that includes electrical pulses that encode a particular amount of light present in the flashes,
each of the electrical pulses has a magnitude or pulse height that corresponds to and encodes the particular amount of light present in at least one of the flashes, and
the at least one pulse height analyzer is to sort the electrical pulses by the pulse height into regions of interest, count a number of the electrical pulses in each of the regions of interest within a unit of time, and transmit one of the region values for each of the regions of interest to the control system.

14. The system of claim 13, wherein the control system is to determine each of the regions of interest is an active region of interest when the control system determines the number of the electrical pulses in the region of interest is greater than an active threshold.

15. The system of claim 14, wherein each of the regions of interest is associated with a different radionuclide.

16. A system comprising:
a material transport system to transport one or more materials;
an assembly comprising an enclosure and an array of radiation detectors, the enclosure comprising an outer shell, an inner shell, a shielding layer, and a curved raceway, the material transport system to transport the one or more materials under the array of radiation detectors, the shielding layer comprising an opening to be adjacent to the one or more materials when transported by the material transport system, the shielding layer being positioned between the outer shell and the inner shell, the inner comprising a hollow internal space, the array of radiation detectors being positioned inside the hollow internal space adjacent the opening, the shielding layer to shield the array of radiation detectors from radiation other than from the one or more materials, the curved raceway to extend through the outer shell, the inner shell, and the shielding layer to allow one or more wires to extend from outside the outer shell through the curved raceway to the array of radiation detectors, the array of radiation detectors each to emit light when a portion of the one or more materials that is contaminated passes under the array of radiation detectors;
an array of photo multiplier tubes, each of the array of radiation detectors corresponding to one of the array of photo multiplier tubes, the array of photo multiplier tubes each to convert the light received from the corresponding radiation detector to an electrical signal encoding an amount of light; and
an array of multichannel pulse height analyzers, each of the array of photo multiplier tubes corresponding to one of the array of multichannel pulse height analyzers, each of the array of multichannel pulse height analyzers to receive the electrical signal from the corresponding photo multiplier tube and output at least one value associated with an amount of radiation detected based at least in part on the electrical signal.

17. The system of claim 16, further comprising:
a diversion system, the material transport system to transport one or more materials to the diversion system after the one or more materials are passed under the array of radiation detectors, the diversion system to transport contaminated and uncontaminated portions of the one or more materials to first and second locations, respectively; and
a control system connected to the array of multichannel pulse height analyzers and the diversion system, the control system to determine when the amount of radiation detected exceeds a threshold value and instruct the diversion system to transport a portion of the one or more materials to the first location when control system determines the amount of radiation detected exceeds the threshold value.

18. The system of claim 16, wherein each radiation detector of the array of radiation detectors is a sodium iodide thallium doped scintillation radiation detector.

19. The system of claim 16, wherein the outer shell has a first lower opening adjacent the opening of the shielding layer,
the inner shell has a second lower opening adjacent the opening of the shielding layer, and
the assembly comprises a window covering the first and second lower openings.

20. The system of claim 19, wherein the window is constructed of titanium.

21. The system of claim 16, wherein the shielding layer is constructed from lead poured between the outer and inner shells.

22. The system of claim 16, further comprising:
a plurality of screw jacks to raise and lower the assembly with respect to the one or more materials being transported by the material transport system.

23. The system of claim 16, wherein the material transport system comprises a transport portion and a return portion, the transport portion to carry materials passed the array of radiation detectors, and the system further comprises:
a shadow shield assembly positioned between the transport portion and the return portion, the shadow shield assembly to reduce radiation shine originating from below the transport portion.

24. The system of claim 16, wherein the array of photo multiplier tubes, and the array of multichannel pulse height analyzers are at least partially housed inside the inner shell with the array of radiation detectors.

25. A system comprising:
a material transport system to transport one or more materials;
an array of radiation detectors, the material transport system to transport the one or more materials under the array of radiation detectors, the array of radiation detectors each to emit light when a portion of the one or more materials that is contaminated passes under the array of radiation detectors;
a detector box comprising an interior that houses the array of radiation detectors, the detector box comprising an outer shell, an inner shell, and a shielding layer positioned in between the outer and inner shells;
a curved raceway to extend through outside the outer shell, the inner shell, and the shielding layer to allow one or more wires to extend from outside the detector box to the array of radiation detectors;
an array of photo multiplier tubes, each of the array of radiation detectors to correspond to one of the array of photo multiplier tubes, each of the array of photo multiplier tubes to convert the light received from the corresponding radiation detector to an electrical signal encoding an amount of light; and
an array of multichannel pulse height analyzers, each of the array of photo multiplier tubes to correspond to one of the array of multichannel pulse height analyzers, each of the array of multichannel pulse height analyzers to receive the electrical signal from the corresponding photo multiplier tube and output at least one value associated with an amount of radiation detected based on at least in part on the electrical signal.

26. The system of claim 25, further comprising:
a diversion system, the material transport system to transport one or more materials to the diversion system after the one or more materials pass under the array of radiation detectors, the diversion system to transport contaminated and uncontaminated portions of the one or more materials to first and second locations, respectively; and a control system connected to the array of multichannel pulse height analyzers and the diversion system, the control system to instruct the diversion system to transport a portion of the one or more materials to either the first location or the second location based, at least in part, on a comparison of the amount of radiation detected and a threshold value.

27. The system of claim 25, further comprising:
a plurality of screw jacks to raise and lower the detector box with respect to the one or more materials being transported by the material transport system.

28. The system of claim 25, wherein the material transport system comprises a transport portion and a return portion, the transport portion to carry materials passed the array of radiation detectors, and the system further comprises:
a shadow shield assembly positioned between the transport portion and the return portion, the shadow shield assembly to reduce radiation shine originating from below the transport portion.

29. The system of claim 25, wherein the array of photo multiplier tubes, and the array of multichannel pulse height analyzers are at least partially housed inside the interior of the detector box with the array of radiation detectors.

* * * * *